(12) United States Patent
Koby et al.

(10) Patent No.: US 10,953,695 B1
(45) Date of Patent: Mar. 23, 2021

(54) LIGHT-WEIGHT WALKER

(71) Applicant: Koby Keyes Product Design, LLC, Carlsbad, CA (US)

(72) Inventors: Jack Koby, Carlsbad, CA (US); Carly Keyes, Encinitas, CA (US)

(73) Assignee: Koby Keyes Product Design, LLC, Carlsbad, CA (US)

( * ) Notice: Subject to any disclaimer, the term of this patent is extended or adjusted under 35 U.S.C. 154(b) by 39 days.

(21) Appl. No.: 15/967,506

(22) Filed: Apr. 30, 2018

Related U.S. Application Data

(63) Continuation-in-part of application No. 15/900,778, filed on Feb. 20, 2018, now Pat. No. 10,639,226.

(60) Provisional application No. 62/462,878, filed on Feb. 23, 2017, provisional application No. 62/598,395, filed on Dec. 13, 2017.

(51) Int. Cl.
*A61G 5/00* (2006.01)
*B60C 7/10* (2006.01)

(52) U.S. Cl.
CPC .......... *B60C 7/10* (2013.01); *B60C 2007/107* (2013.01)

(58) Field of Classification Search
CPC .... B60C 7/18; B60C 7/22; B60C 7/12; B60C 9/00; A61G 5/00; A61G 5/08; A61G 5/14
See application file for complete search history.

(56) References Cited

U.S. PATENT DOCUMENTS

| | | | |
|---|---|---|---|
| 3,907,370 A * | 9/1975 | Bard | B60B 5/02 |
| | | | 301/63.102 |
| 4,510,956 A | 4/1985 | King | |
| 4,832,098 A * | 5/1989 | Palinkas | B60C 7/12 |
| | | | 152/11 |
| 4,985,947 A | 1/1991 | Ethridge | |
| 5,020,560 A | 6/1991 | Turbeville | |
| 5,224,717 A | 7/1993 | Lowen | |
| 5,520,402 A | 5/1996 | Nestor et al. | |
| 6,338,493 B1 | 1/2002 | Wohlgemuth et al. | |
| 6,343,802 B1 | 2/2002 | Workman et al. | |
| 6,681,822 B2 * | 1/2004 | Adams | B60B 9/00 |
| | | | 152/326 |
| 6,743,156 B1 | 6/2004 | Jacques, II et al. | |
| 7,111,856 B1 | 9/2006 | Graham | |
| 7,179,200 B1 | 2/2007 | Wu | |
| 7,201,194 B2 * | 4/2007 | Rhyne | B60B 9/04 |
| | | | 152/11 |
| 7,418,988 B2 * | 9/2008 | Cron | B60C 7/18 |
| | | | 152/11 |
| 7,992,584 B1 | 8/2011 | Birnbaum | |
| 8,104,524 B2 * | 1/2012 | Manesh | B60B 9/00 |
| | | | 152/301 |

(Continued)

*Primary Examiner* — Hau V Phan
(74) *Attorney, Agent, or Firm* — Clause Eight IPS; Michael Catania

(57) ABSTRACT

An improved wheel for a mobility apparatus designed is disclosed herein. The wheel conforms to obstacles in the ground, creating a smoother walking experience. The inner web of a tire of the wheel preferably consists of polygonal reliefs offset from each other over multiple layers in a radially symmetric pattern to create a web which naturally compresses to absorb shock from obstacles. The tire's inner core preferably consists of a hexagonal membrane that extends parallel to the axel of the tire and extends out of each side of the wheel such that it is visible.

20 Claims, 27 Drawing Sheets

(56) References Cited

U.S. PATENT DOCUMENTS

| | | | |
|---|---|---|---|
| 8,109,308 B2* | 2/2012 | Manesh | B60C 7/14 |
| | | | 152/326 |
| 8,166,987 B2 | 5/2012 | Weaver | |
| 8,176,957 B2* | 5/2012 | Manesh | B60C 7/12 |
| | | | 152/301 |
| 8,434,780 B2 | 5/2013 | Li | |
| 8,468,622 B2 | 6/2013 | Purwar et al. | |
| 8,540,256 B1 | 9/2013 | Simpson | |
| 8,555,941 B2* | 10/2013 | Perron | B60C 7/18 |
| | | | 152/246 |
| 8,596,658 B1 | 12/2013 | Dashew et al. | |
| 8,740,242 B2 | 6/2014 | Slomp | |
| 8,944,125 B2* | 2/2015 | Manesh | B60C 7/12 |
| | | | 152/326 |
| 9,120,351 B2* | 9/2015 | Mun | B60C 7/18 |
| 9,314,395 B1 | 4/2016 | VanAusdall | |
| 9,333,799 B2* | 5/2016 | Choi | B60C 7/18 |
| 9,387,726 B2* | 7/2016 | Choi | B60C 7/18 |
| 9,566,207 B1 | 2/2017 | Ratliff | |
| 9,573,422 B2* | 2/2017 | Gass | B60B 9/00 |
| 9,585,807 B2 | 3/2017 | Fellingham et al. | |
| D784,917 S * | 4/2017 | Schaedler | D12/592 |
| 9,662,264 B2 | 5/2017 | Jacobs | |
| 9,751,270 B2* | 9/2017 | Thompson | B60C 7/102 |
| 9,969,219 B2* | 5/2018 | Iwamura | B60C 7/22 |
| 2009/0173421 A1* | 7/2009 | Love | A63C 17/22 |
| | | | 152/246 |
| 2009/0211674 A1* | 8/2009 | Hanada | B60C 7/12 |
| | | | 152/53 |
| 2009/0283185 A1* | 11/2009 | Manesh | B60B 9/00 |
| | | | 152/11 |
| 2010/0200131 A1* | 8/2010 | Iwase | B29D 30/00 |
| | | | 152/209.1 |
| 2013/0240272 A1* | 9/2013 | Gass | B60B 9/00 |
| | | | 180/54.1 |
| 2014/0238561 A1* | 8/2014 | Choi | B60C 7/18 |
| | | | 152/17 |
| 2017/0087937 A1* | 3/2017 | Korus | B60B 3/04 |
| 2017/0120679 A1* | 5/2017 | Naiva | B60B 33/0028 |
| 2017/0209331 A1 | 7/2017 | Scherr | |

* cited by examiner

30

30

40

40

40

70

70

80

80

90

90

100

100

110

110

LIGHT-WEIGHT WALKER

CROSS REFERENCE TO RELATED APPLICATION

The Present application is a continuation-in-part application of U.S. patent application Ser. No. 15/900,778, filed on Feb. 20, 2018, which claims priority to U.S. Provisional Patent Application No. 62/462,878, filed on Feb. 23, 2017, and U.S. Provisional Patent Application No. 62/598,395, filed on Dec. 13, 2017, each of which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention generally relates to walkers for individuals.

Description of the Related Art

As people grow old it becomes increasingly hard for them to move. Walking, however, is extremely important for elderly people's quality of life. Being able to walk allows elderly people to be more independent in every way from visiting friends, to attending doctors appointments, to simply getting out of bed and going to the bathroom without assistance.

Elderly people suffer from arthritis and lack of balance, meaning they need mobility aids to properly support them while they walk. A mobility aide must also be comfortable enough to use regularly without creating additional health problems or exacerbating joint pain. We found that many of the existing options don't offer sufficient support for walking independently. They are also extremely uncomfortable to use, resulting in wrist strain and backaches. We wanted to create a walker that would comfortably allow elderly people to continue walking later in life.

The prior art discusses various mobility assistance apparatuses, such as walkers.

A person using a walker is usually arched over, places pressure on the handles of the walker resulting in strain on the wrist of the person, and the walker does not generally provide that much support to the person.

The walker is typically used in front of the person.

Most walker wheels are small in diameter and composed of a hard plastic material. Getting over a bump is difficult due to this small wheel diameter and unforgiving plastic material.

Walker wheels don't generate heat.

BRIEF SUMMARY OF THE INVENTION

The present invention is an improved wheel for a mobility apparatus such as a walker designed for the elderly. The wheels of the improved mobility apparatus conform to obstacles in the ground, creating a smoother walking experience.

One aspect of the present invention is a wheel for a mobile apparatus. The wheel comprises a hub and a low impact tire.

Another aspect of the present invention is a wheel for a mobile apparatus comprising a frame and a plurality of wheel assemblies, each of the wheel assemblies comprising a hub and a low impact tire, the hub connected to the frame.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

FIG. 4A is front cut-away view of the tire of FIG. 1.
FIG. 4B is a cross-section view of the tire of FIG. 4.

DETAILED DESCRIPTION OF THE INVENTION

As shown in the figures, the present invention is an improved wheel for a mobility apparatus.

Figure 1:
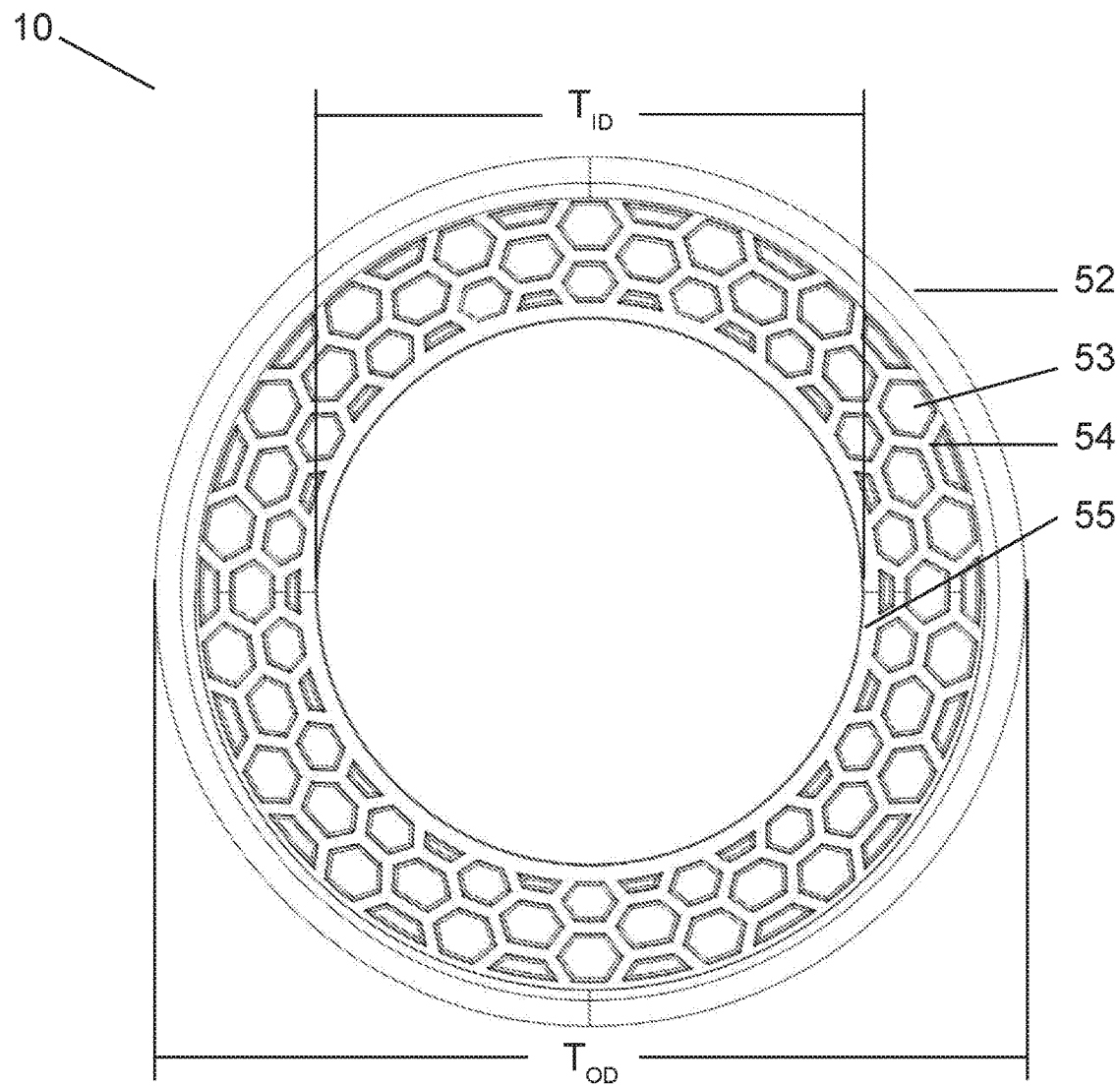
FIG. 1 is side elevation of a first embodiment of a tire.
Figure 2:
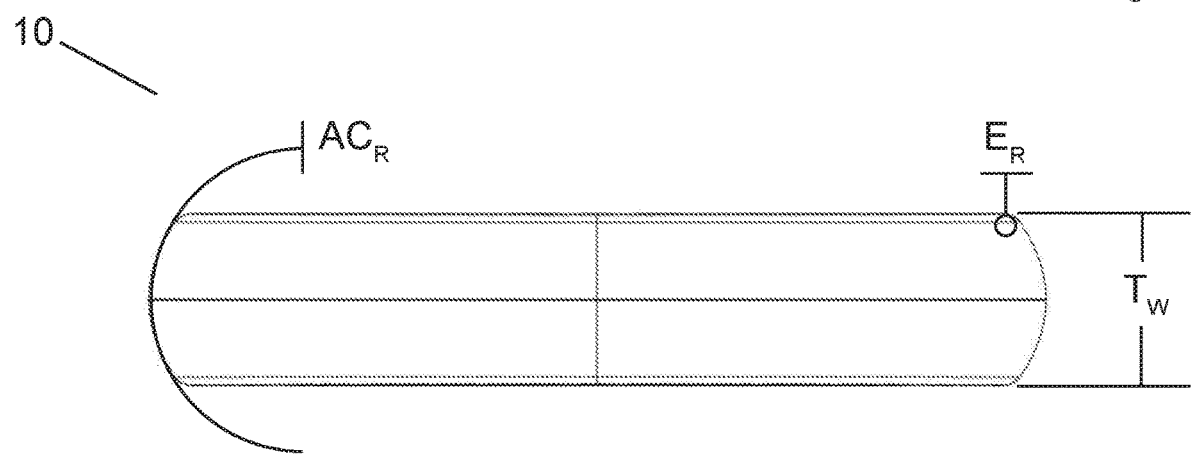
FIG. 2 is a top plan view of the tire of FIG. 1 showing the crown tire surface.
Figure 3:
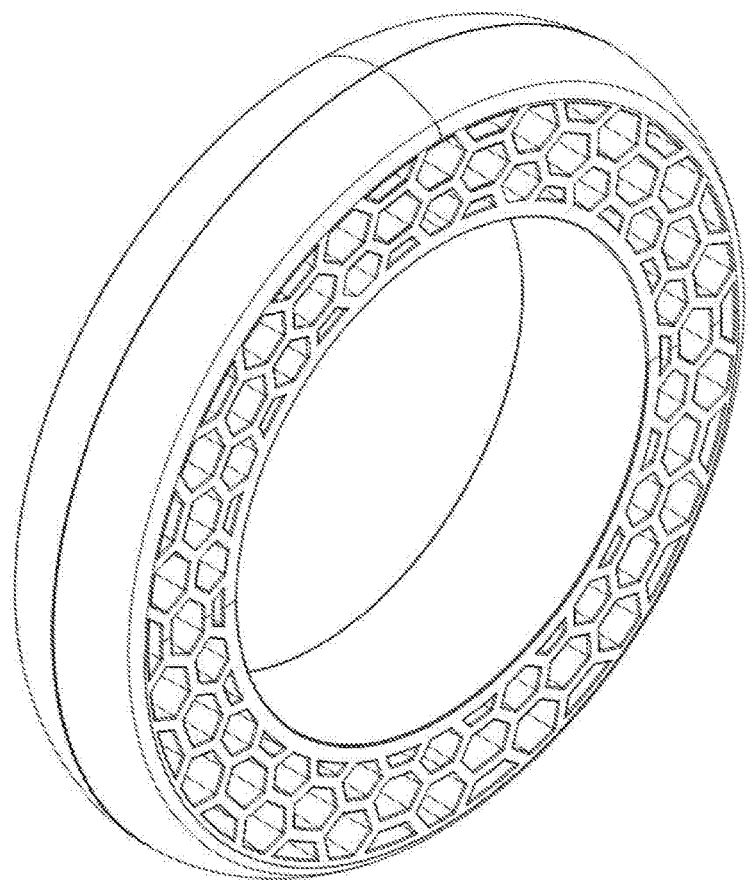
FIG. 3 is a top perspective of the tire of FIG. 1.
Figure 4:
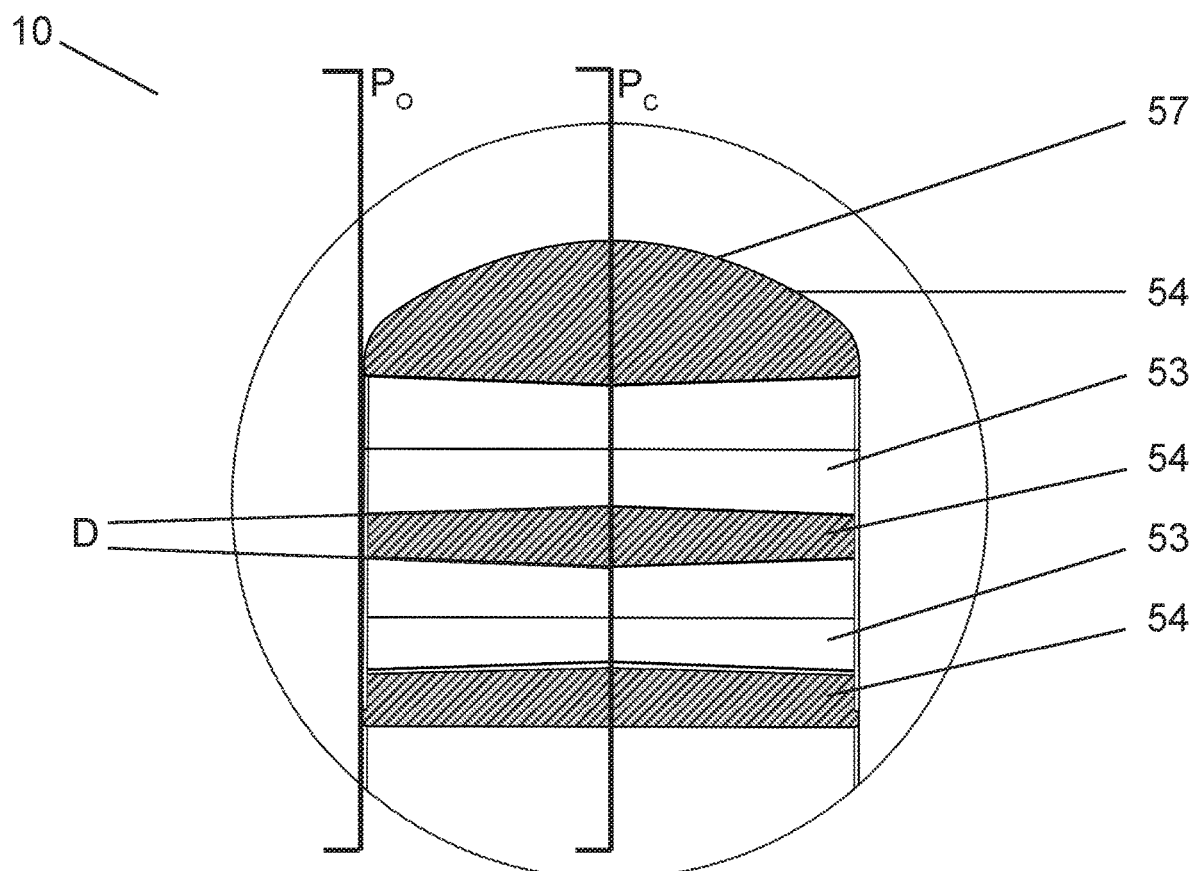
FIG. 4 is a side plan view of FIG. 1.
Figure 4:
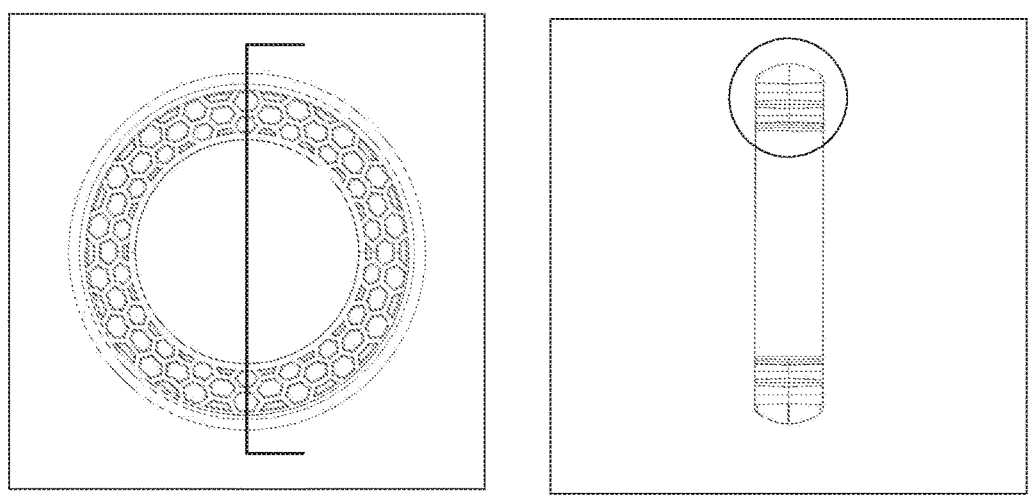
Figure 5:
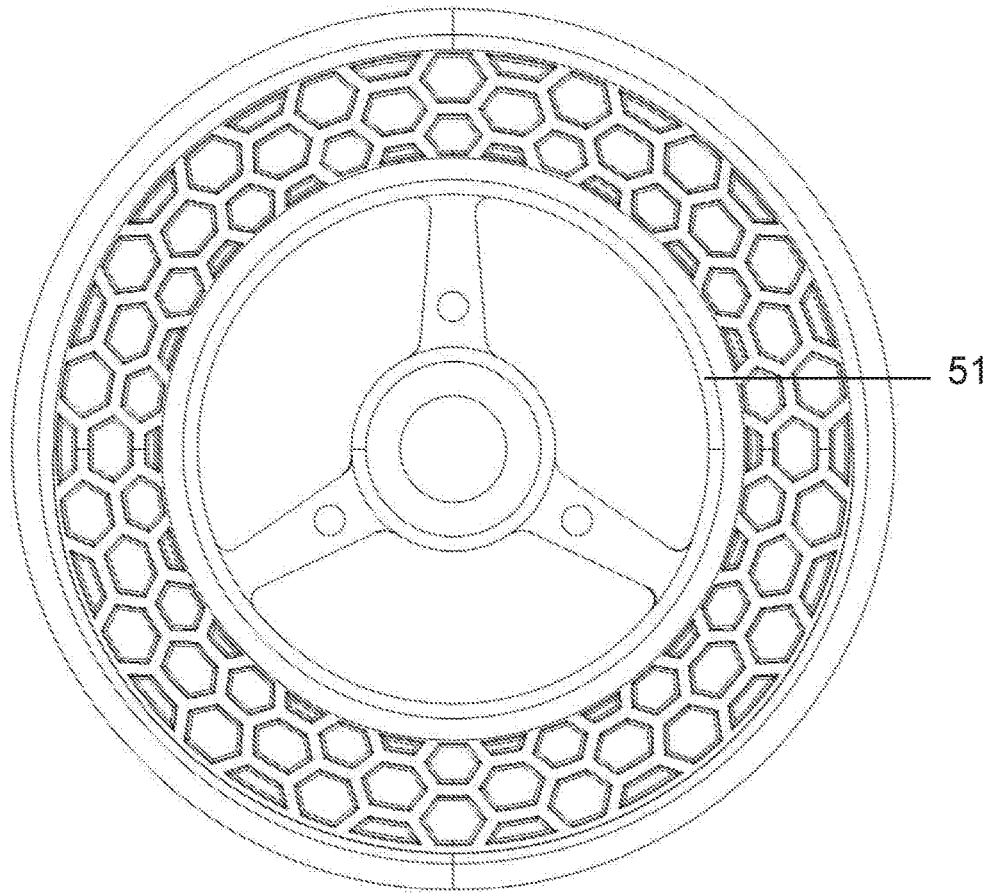
FIG. 5 is a side elevation view of a wheel with the tire of FIG. 1 mounted on a rim.
Figure 6:
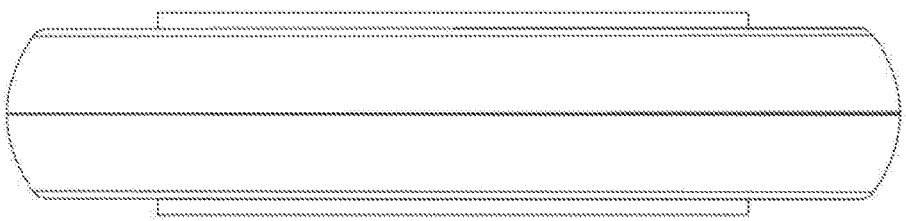
FIG. 6 is a top plan view of FIG. 5.
Figure 7:
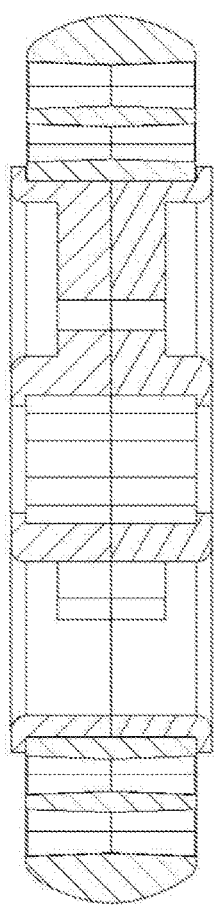
FIG. 7 is a cross-section view of the wheel of FIG. 5.

FIGS. 1-4 illustrate a first embodiment of a tire 10. FIGS. 5-7 illustrate the tire 10 mounted on a rim 51. The tire 10 has a multitude of hexagonal reliefs 53, each defined by a multitude of web walls 54. The tire 10 has an outer diameter edge 52 and an inner diameter edge 55. The tire 10 has an arc 57.

Figure 8:
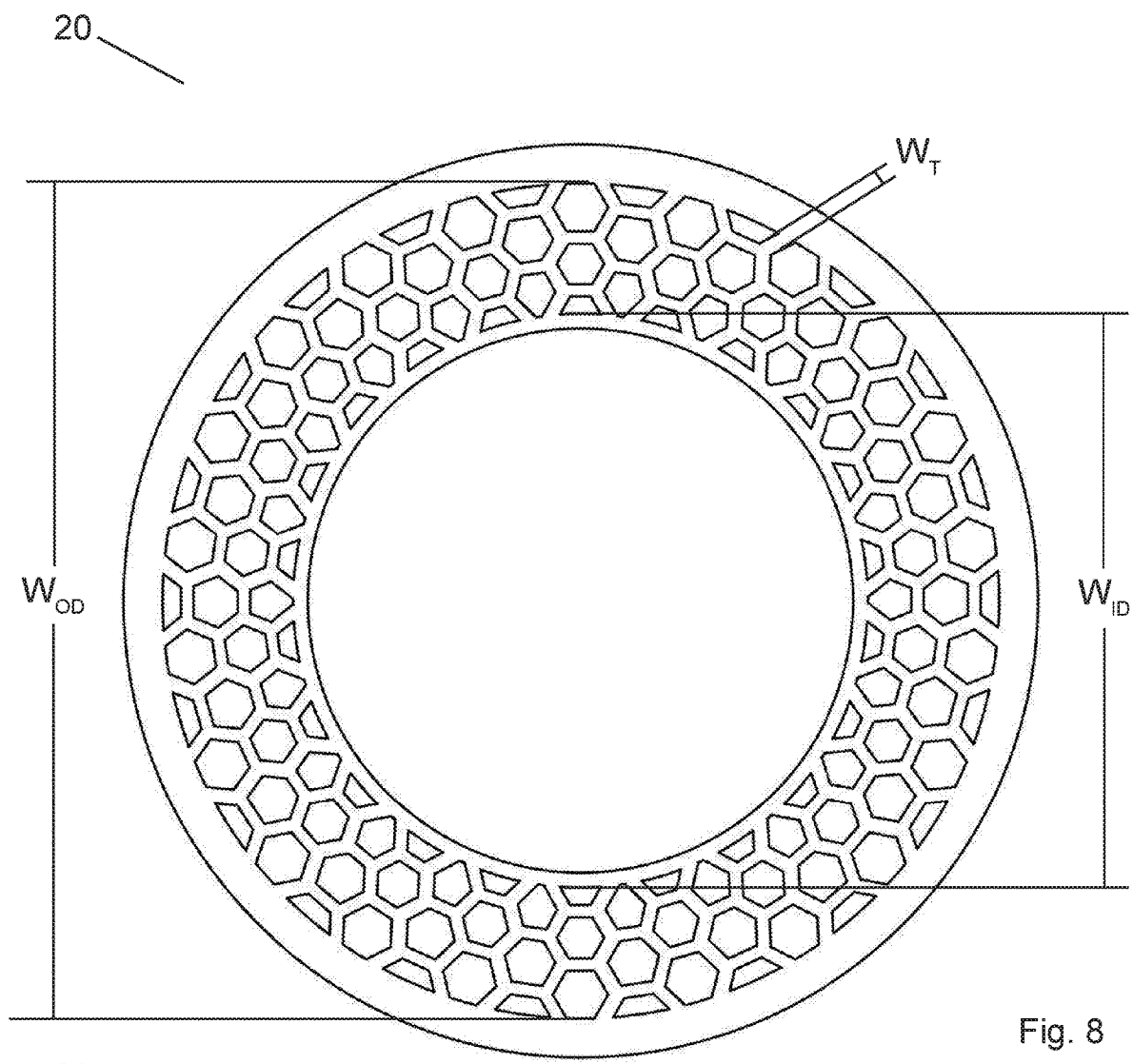
FIG. 8 is side elevation of a second embodiment of a tire.
Figure 9:
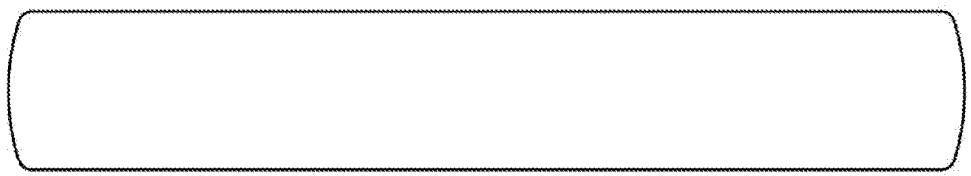
FIG. 9 is a top plan view of the tire of FIG. 8 showing the crown tire surface.
Figure 10:
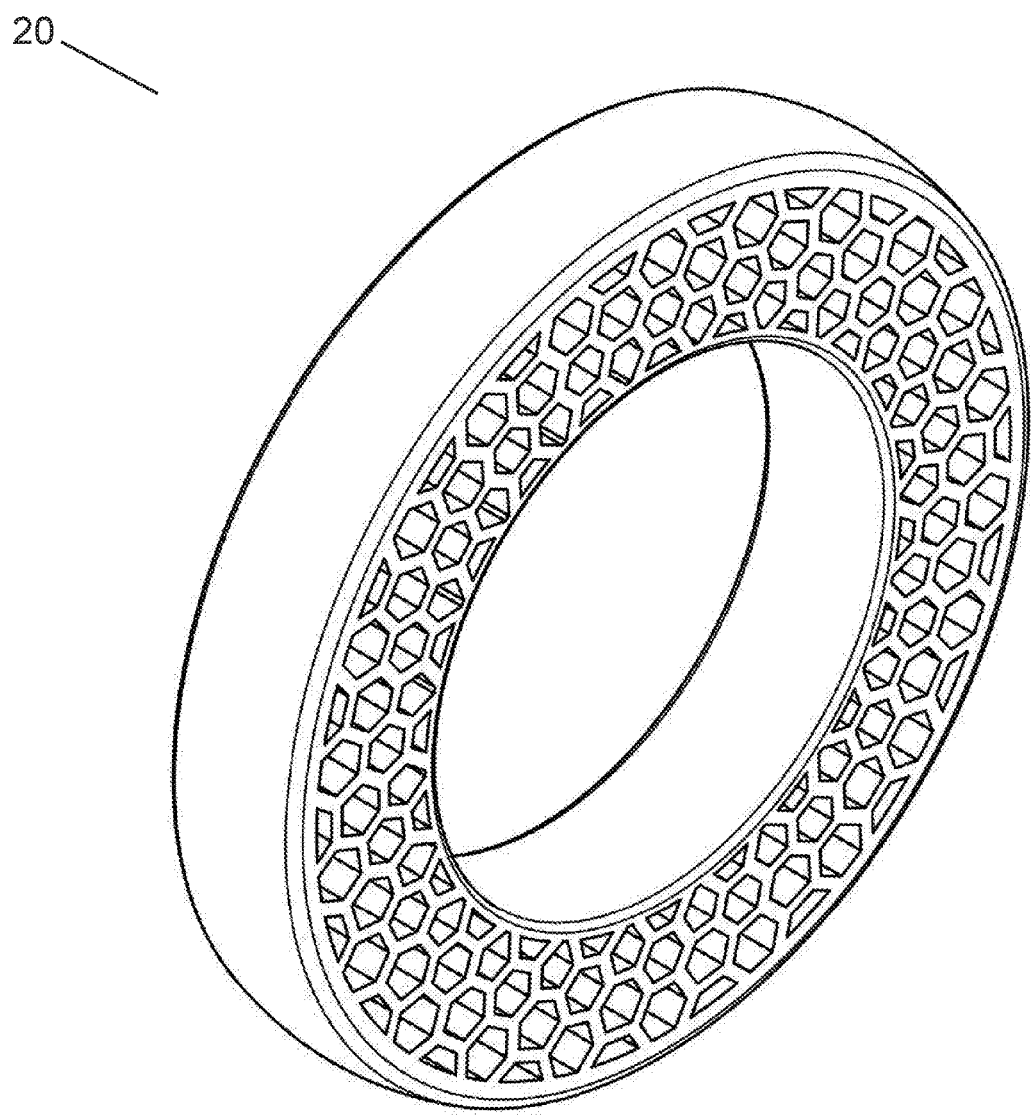
FIG. 10 is a top perspective of the tire of FIG. 8.

FIGS. 8-10 illustrate a second embodiment of a tire 20.

Figure 11:
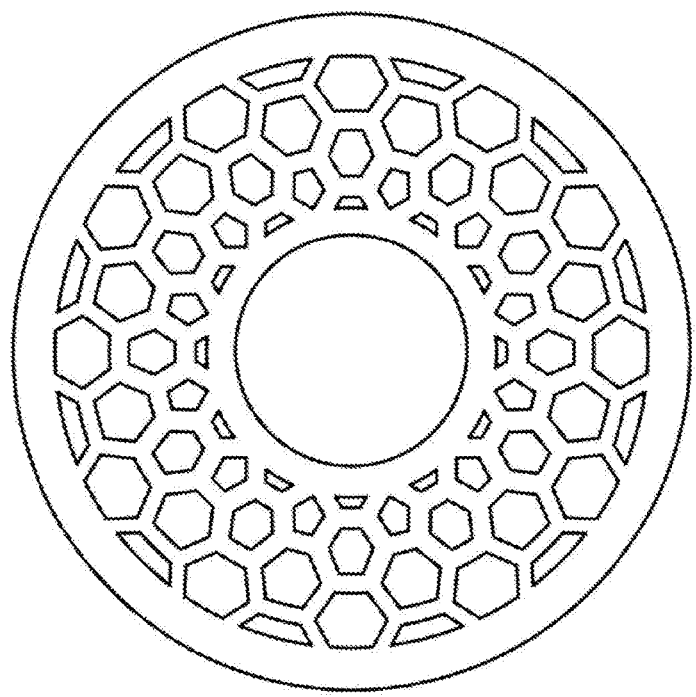
FIG. 11 is side elevation of a third embodiment of a tire with increasing thickness in the hexagonal membrane.
Figure 12:
FIG. 12 is a top plan view of the tire of FIG. 11 showing the crown tire surface.
Figure 13:
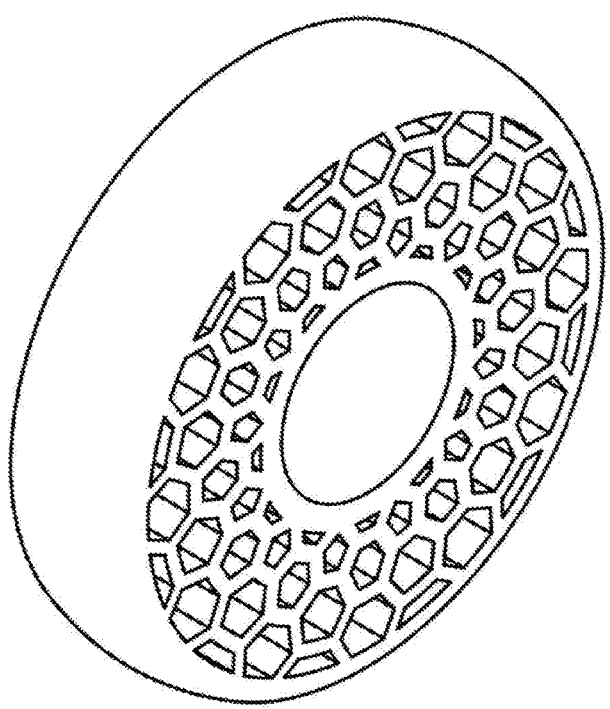
FIG. 13 is a top perspective of the tire of FIG. 11.

FIGS. 11-13 illustrate a third embodiment of a tire 30 with increasing thickness in the hexagonal membrane.

Figure 14:
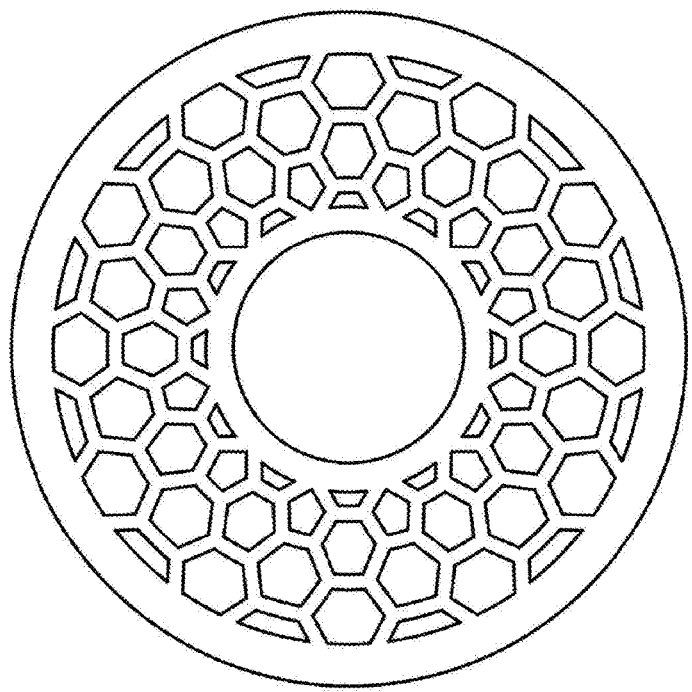
FIG. 14 is side elevation of a fourth embodiment of a tire with uniform thickness in the hexagonal membrane.
Figure 15:
FIG. 15 is a top plan view of the tire of FIG. 14 showing the crown tire surface.
Figure 16:
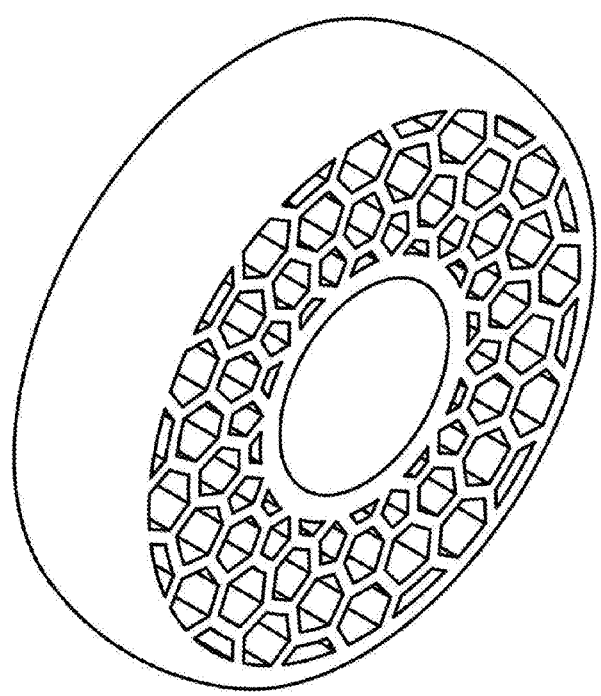
FIG. 16 is a top perspective of the tire of FIG. 14.

FIGS. 14-16 illustrate a fourth embodiment of a tire 40 with uniform thickness in a hexagonal membrane.

Figure 17:
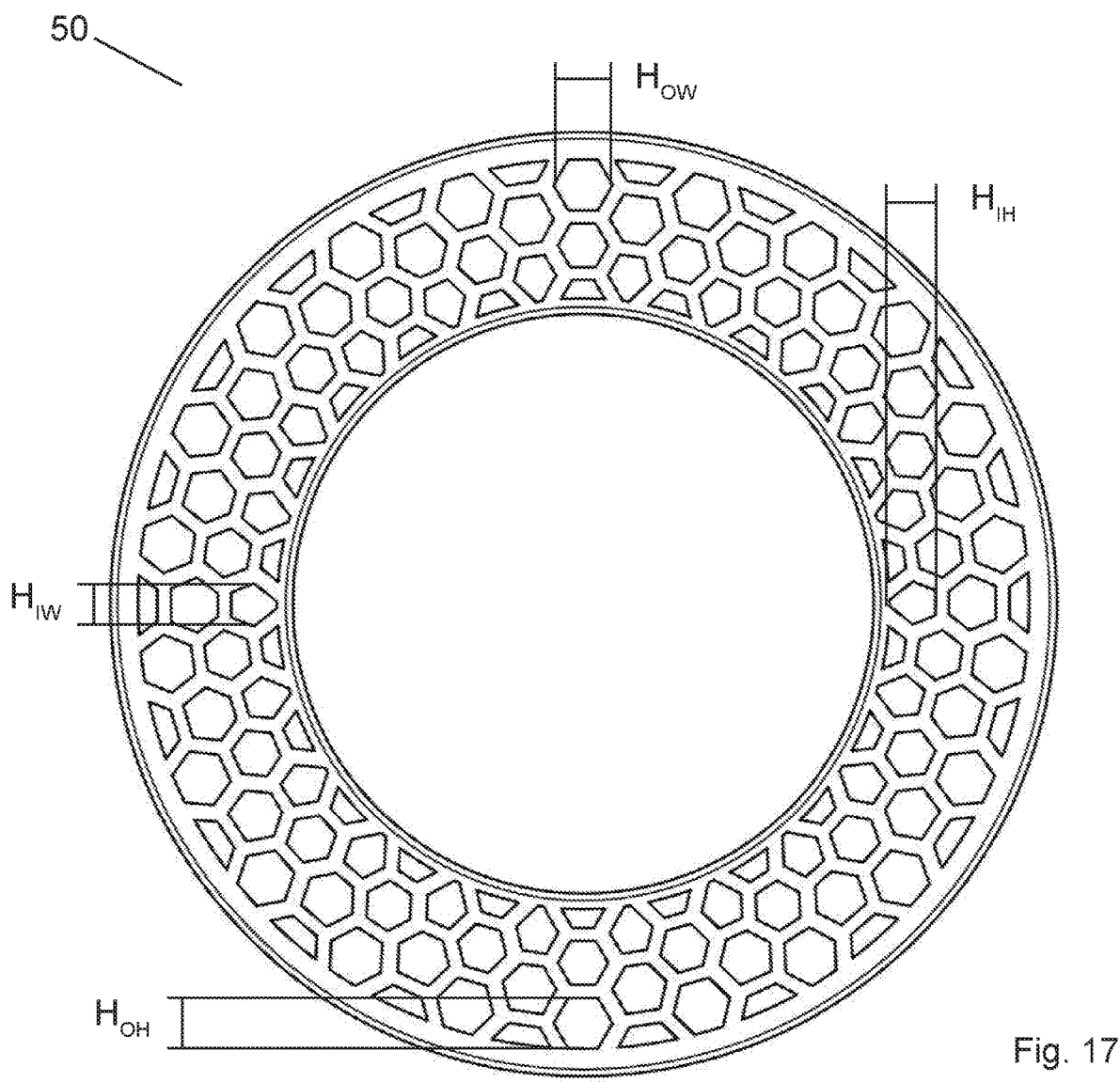
FIG. 17 is side elevation of a fifth embodiment of a tire.
Figure 18:
FIG. 18 is a top plan view of the tire of FIG. 17 showing the crown tire surface.
Figure 19:
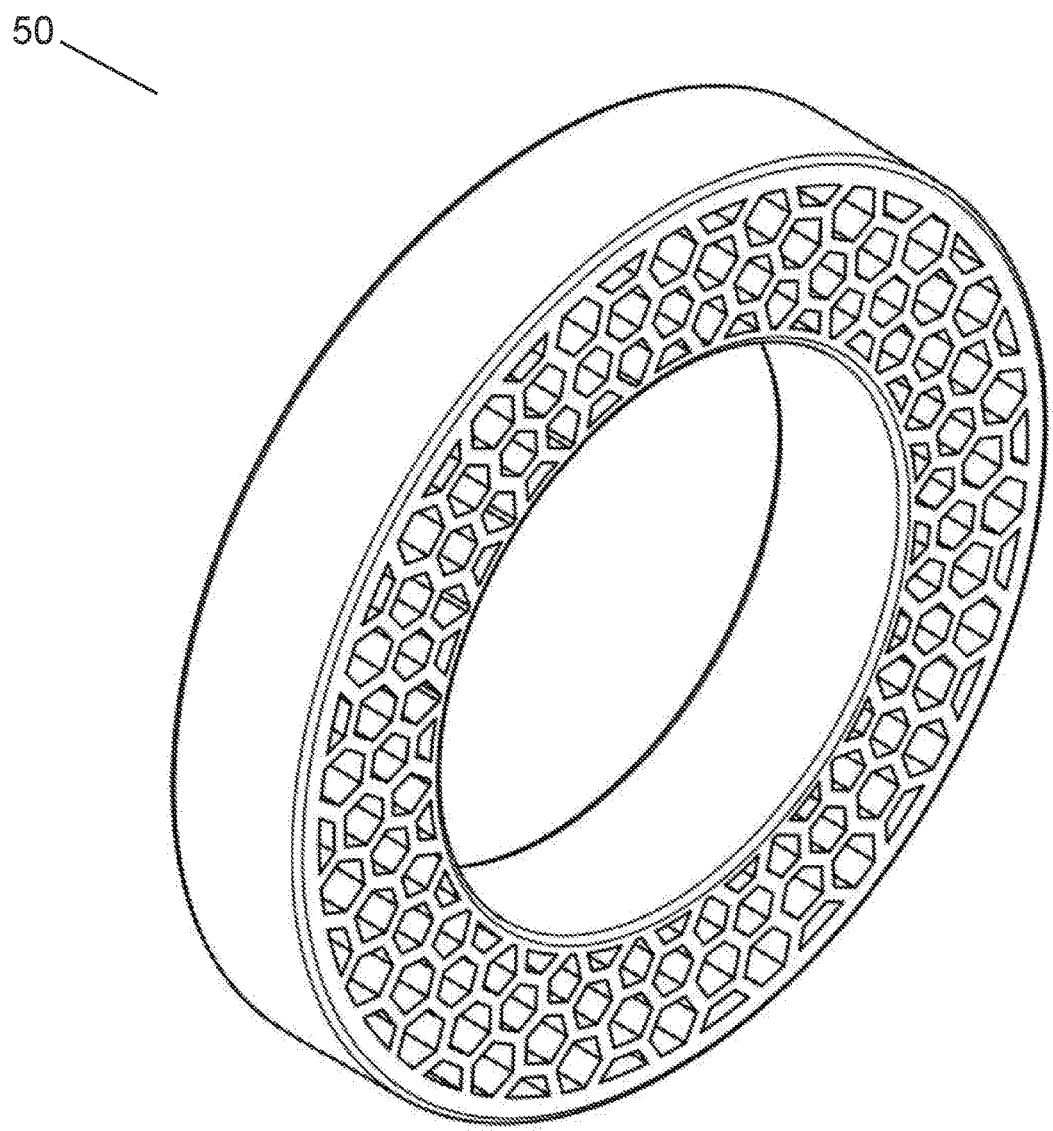
FIG. 19 is a top perspective of the tire of FIG. 17.

FIGS. 17-19 illustrate a fifth embodiment of a tire 50.

Figure 20:
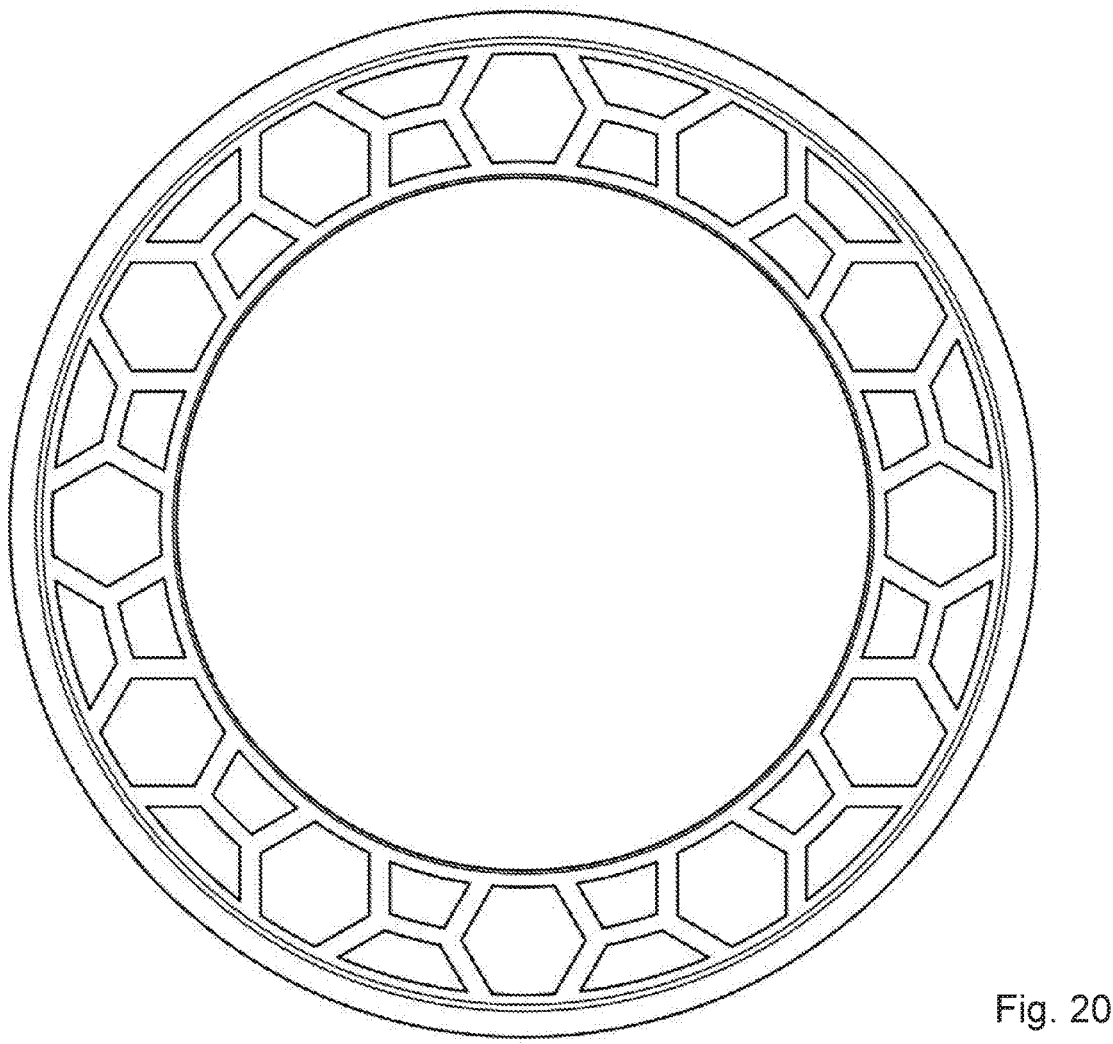
FIG. 20 is side elevation of a sixth embodiment of a tire.
Figure 21:
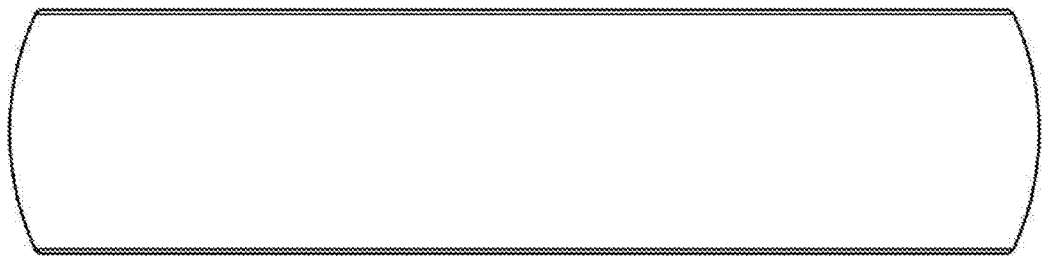
FIG. 21 is a top plan view of the tire of FIG. 20 showing the crown tire surface.
Figure 22:
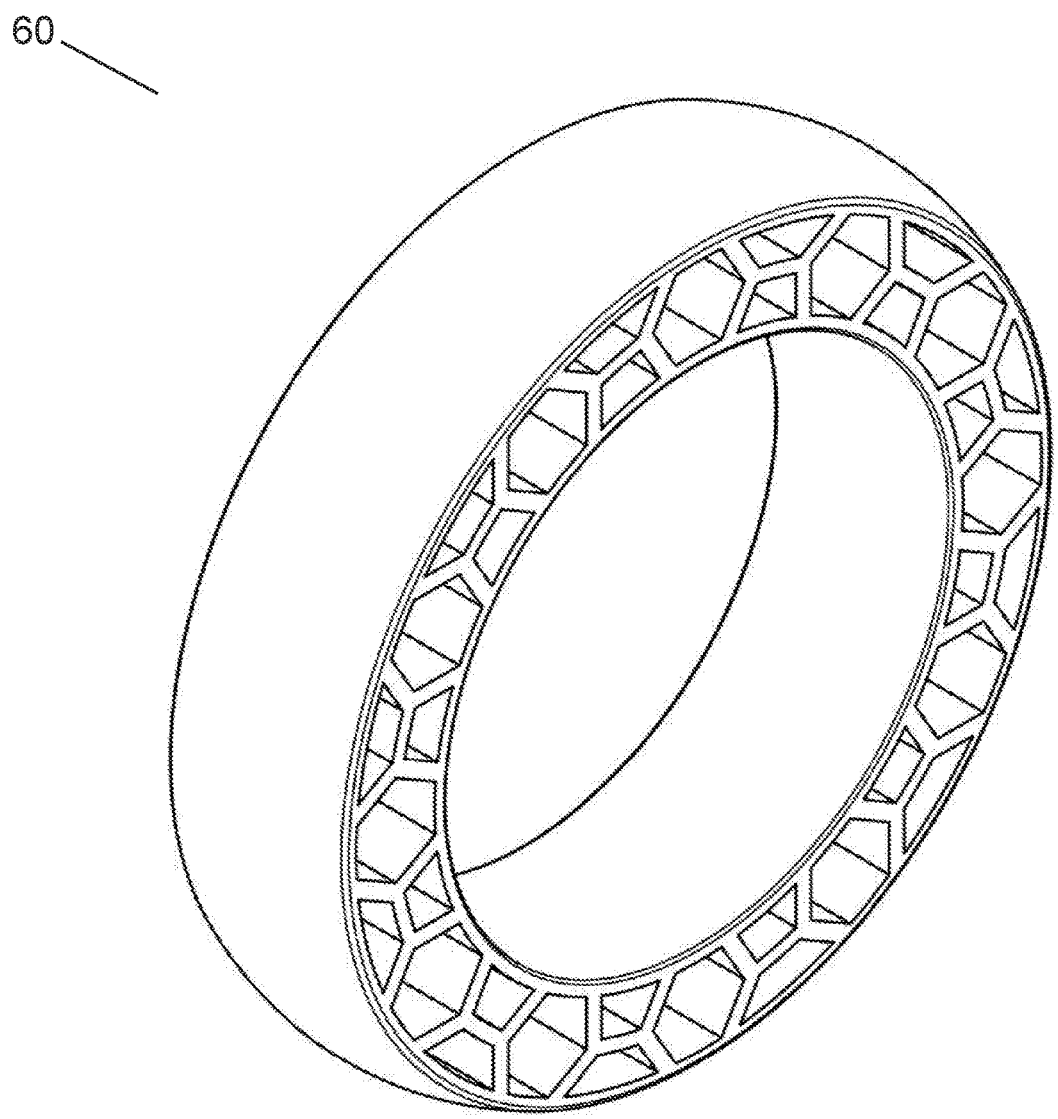
FIG. 22 is a top perspective of the tire of FIG. 20.

FIGS. 20-22 illustrate a sixth embodiment of a tire 60.

Figure 23:
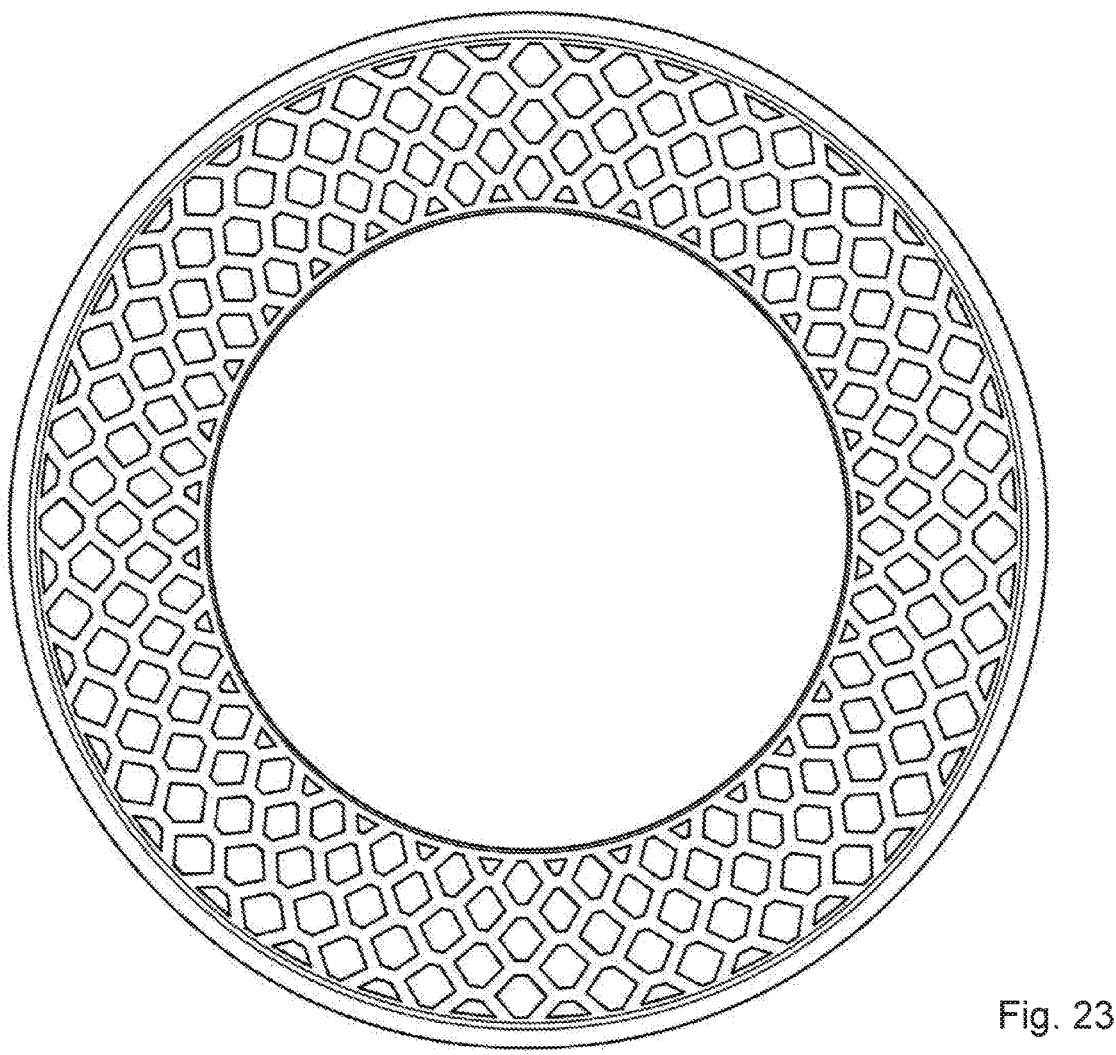
FIG. 23 is side elevation of a seventh embodiment of a tire.
Figure 24:
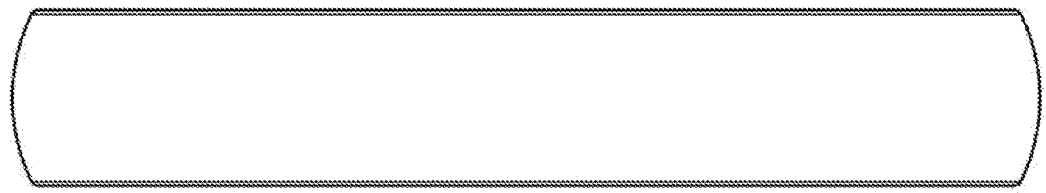
FIG. 24 is a top plan view of the tire of FIG. 23 showing the crown tire surface.
Figure 25:
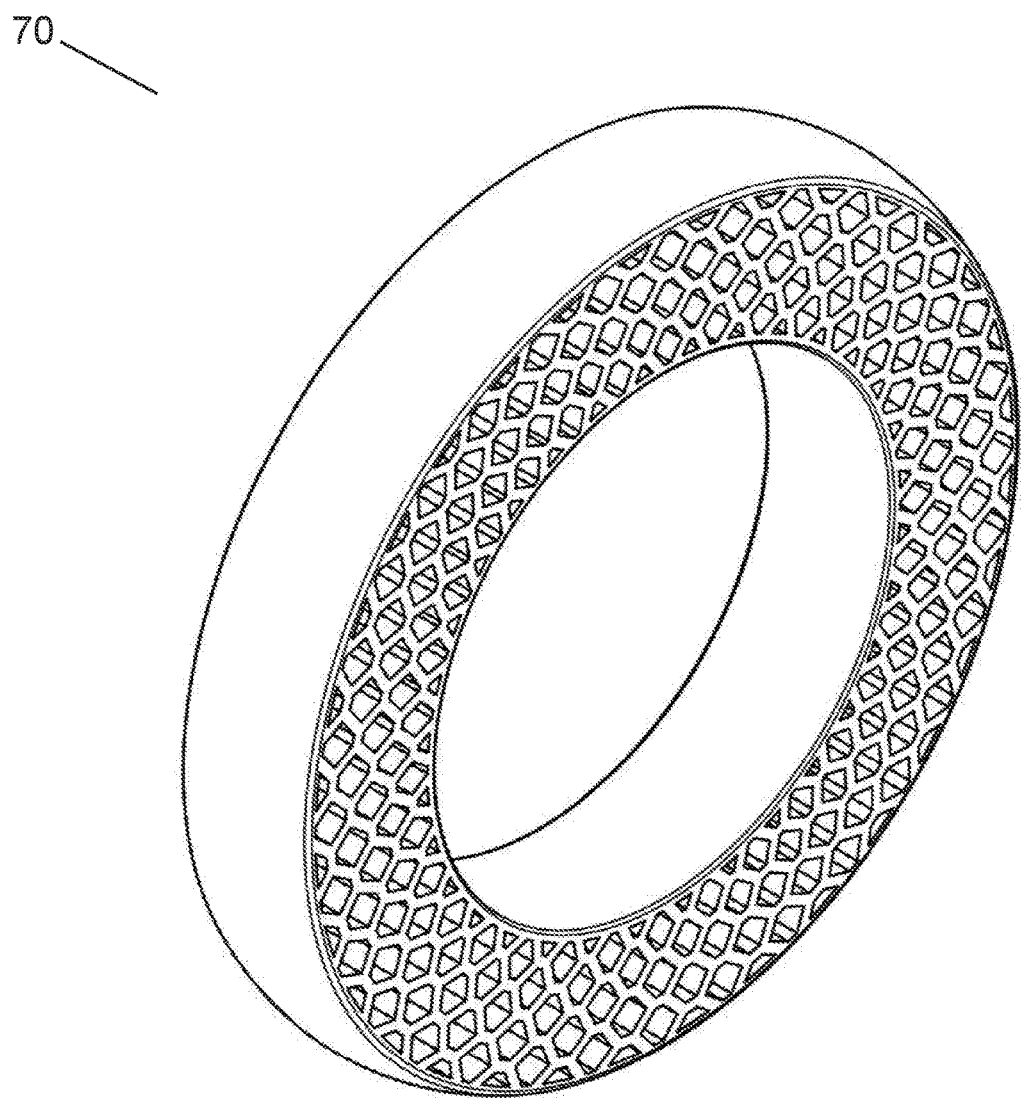
FIG. 25 is a top perspective of the tire of FIG. 23.

FIGS. 23-25 illustrate a seventh embodiment of a tire 70.

Figure 26:
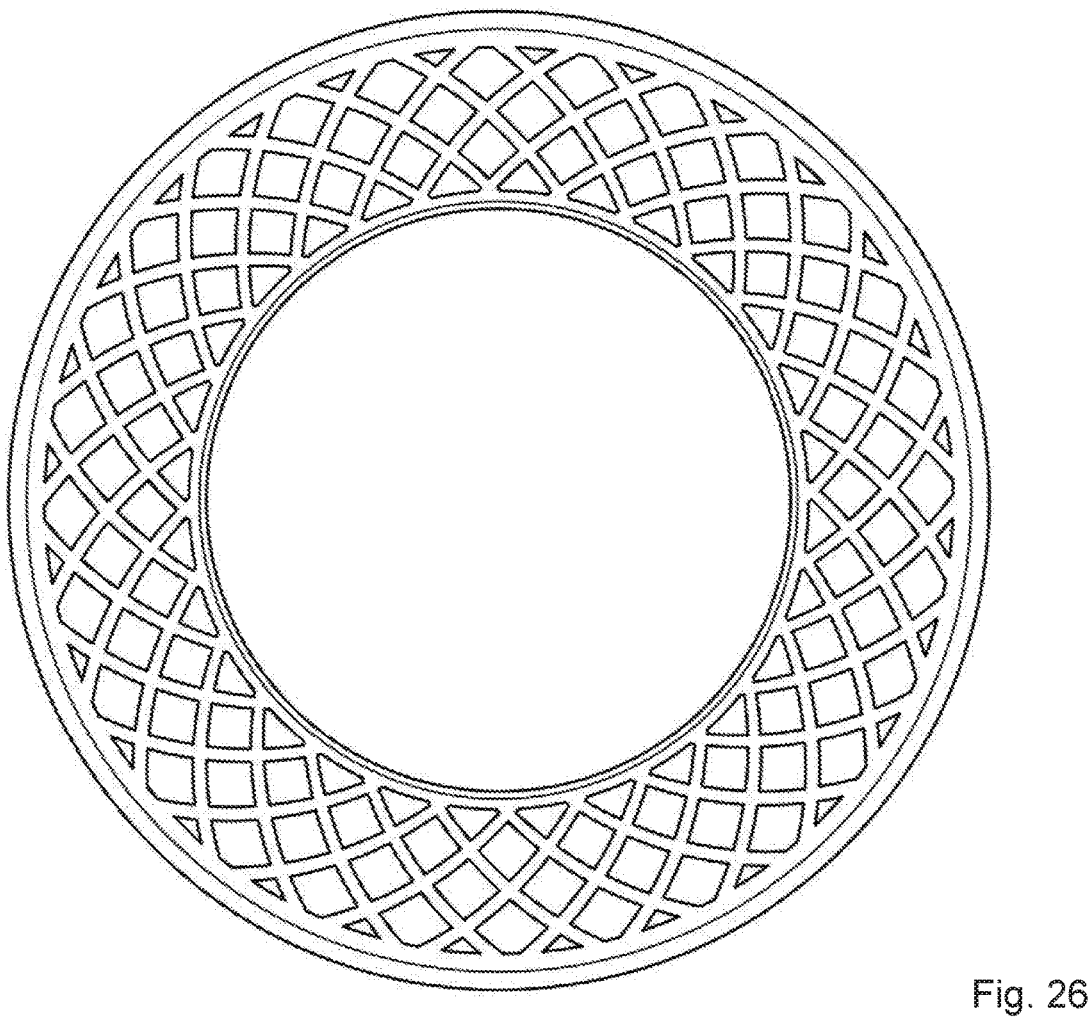
FIG. 26 is side elevation of an eighth embodiment of a tire.
Figure 27:
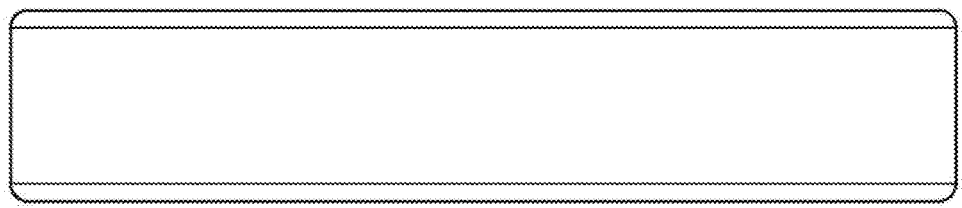
FIG. 27 is a top plan view of the tire of FIG. 26 showing the crown tire surface.
Figure 28:
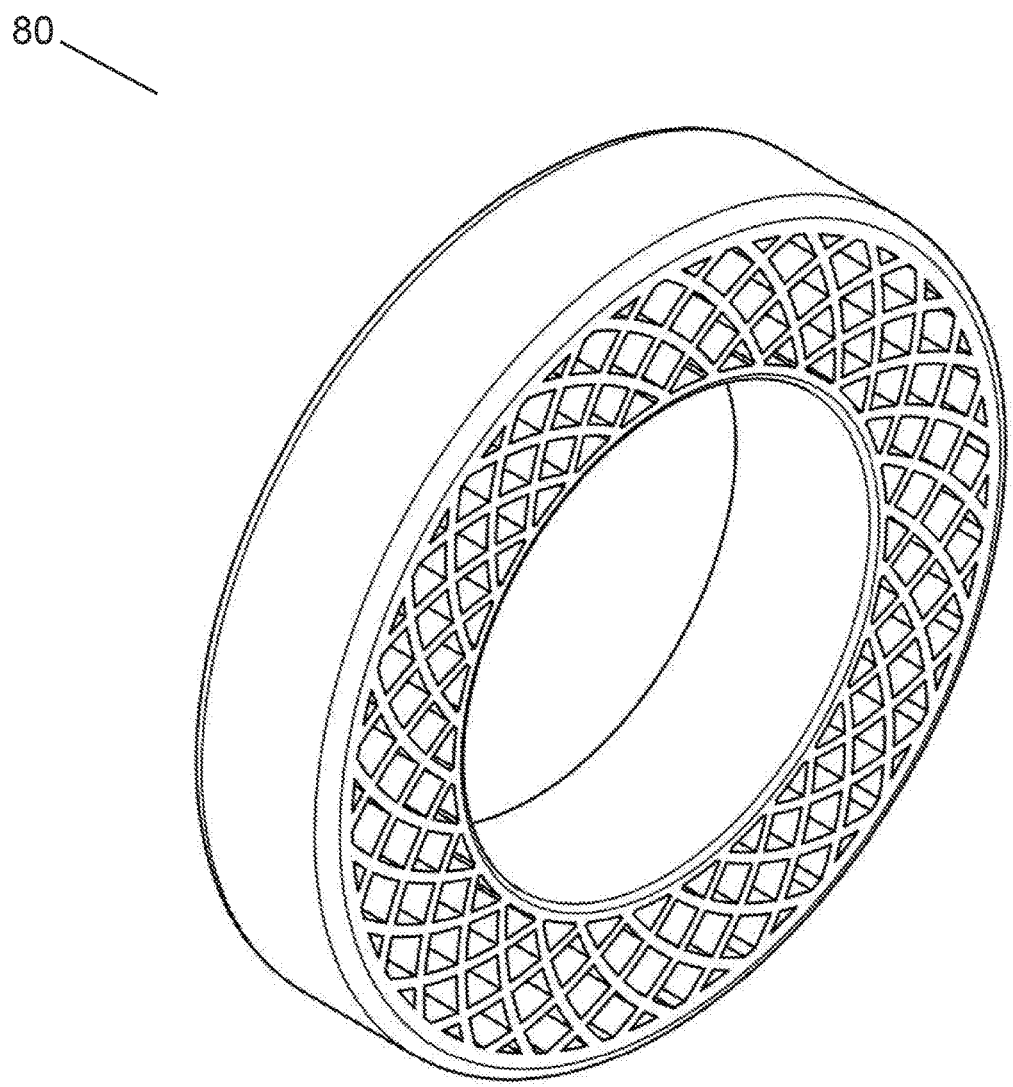
FIG. 28 is a top perspective of the tire of FIG. 26.

FIGS. 26-28 illustrate a eighth embodiment of a tire 80.

Figure 29:
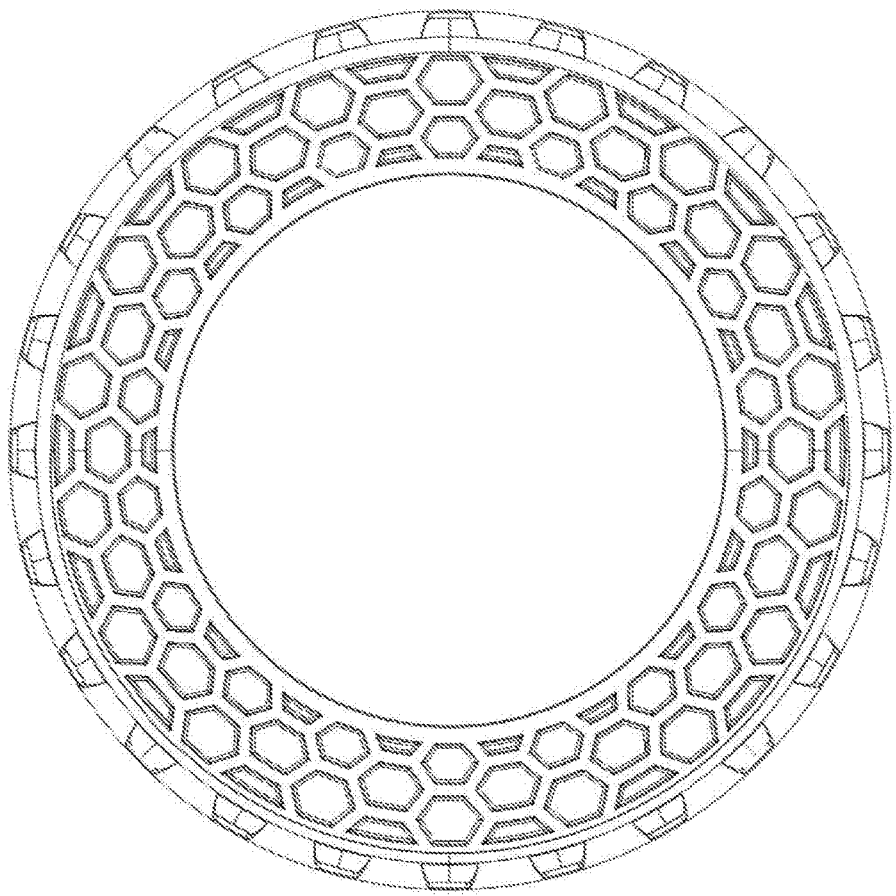
FIG. 29 is side elevation of a ninth embodiment of a tire with a tread pattern.
Figure 30:
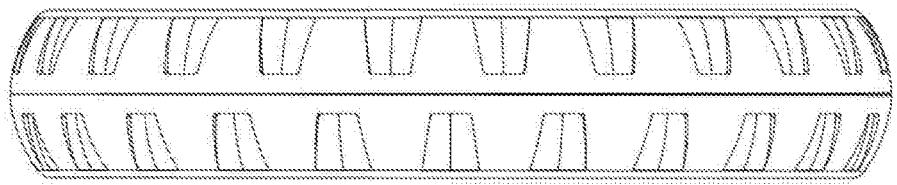
FIG. 30 is a top plan view of the tire of FIG. 29 showing the crown tire surface.
Figure 31:
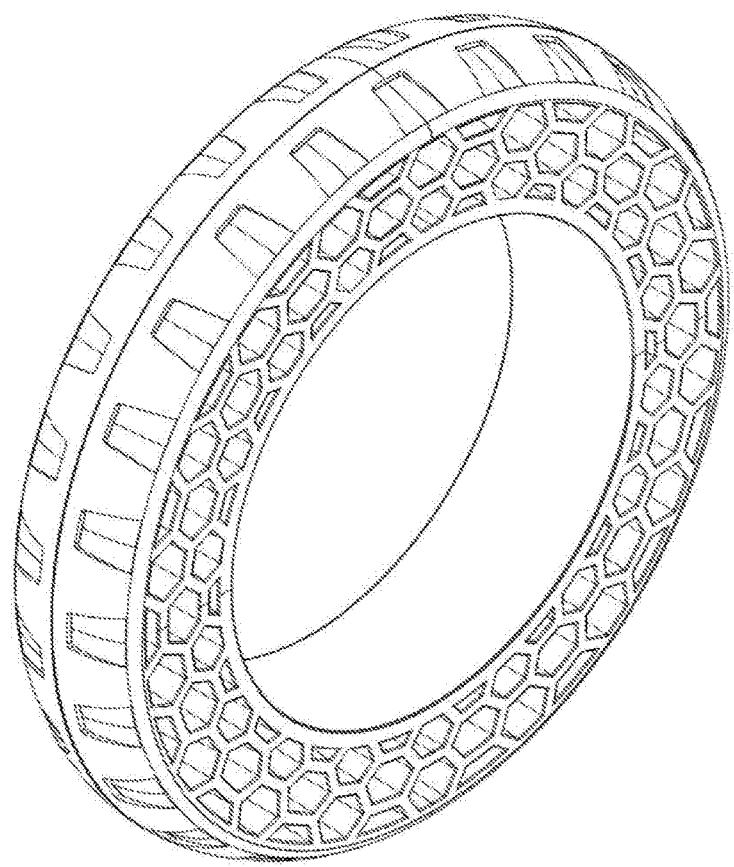
FIG. 31 is a top perspective of the tire of FIG. 30.

FIGS. 29-31 illustrate a ninth embodiment of a tire 90 with a tread pattern.

Figure 32:
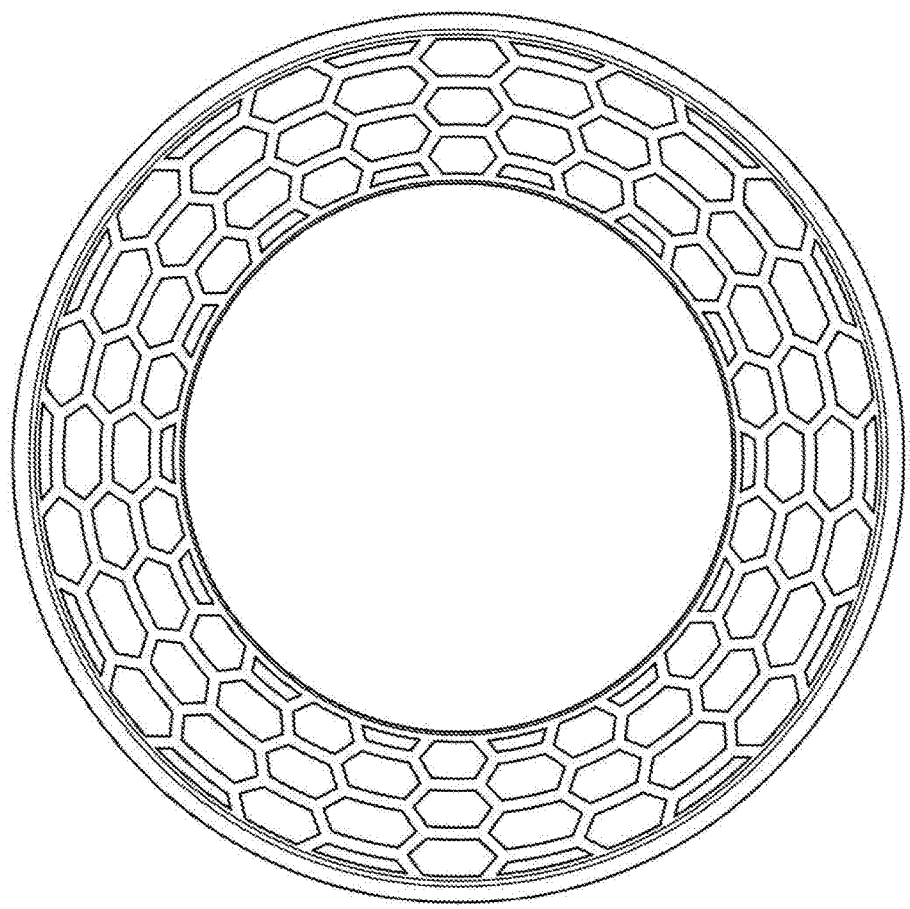
FIG. 32 is side elevation of a tenth embodiment of a tire with a tread pattern.
Figure 33:
FIG. 33 is a top plan view of the tire of FIG. 32 showing the crown tire surface.
Figure 34:
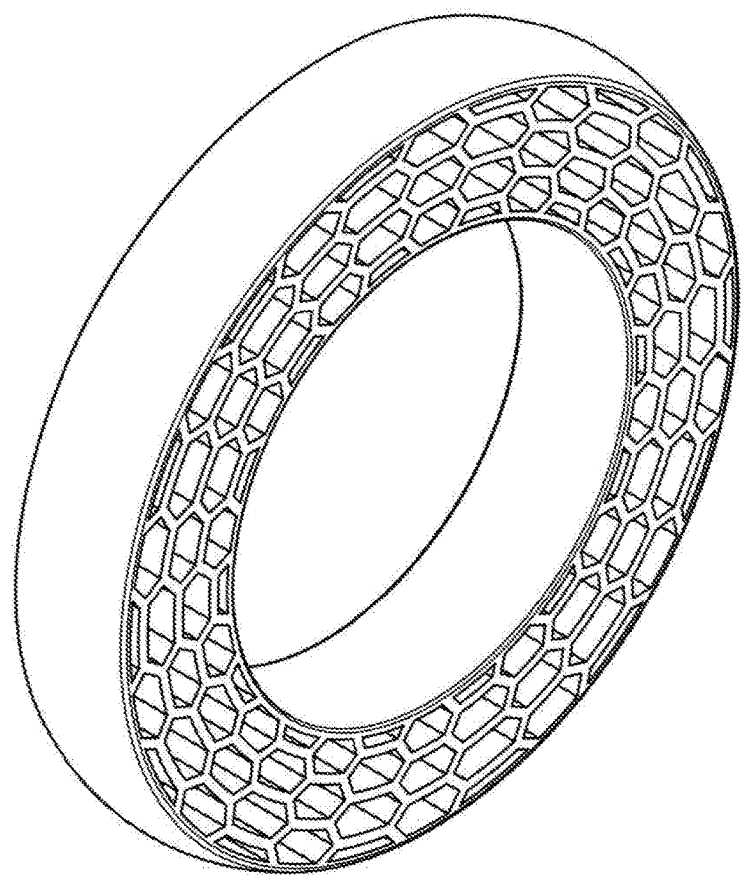
FIG. 34 is a top perspective of the tire of FIG. 32.

FIG. 32-34 illustrate a tenth embodiment 100 of a tire with a tread pattern.

Figure 35:
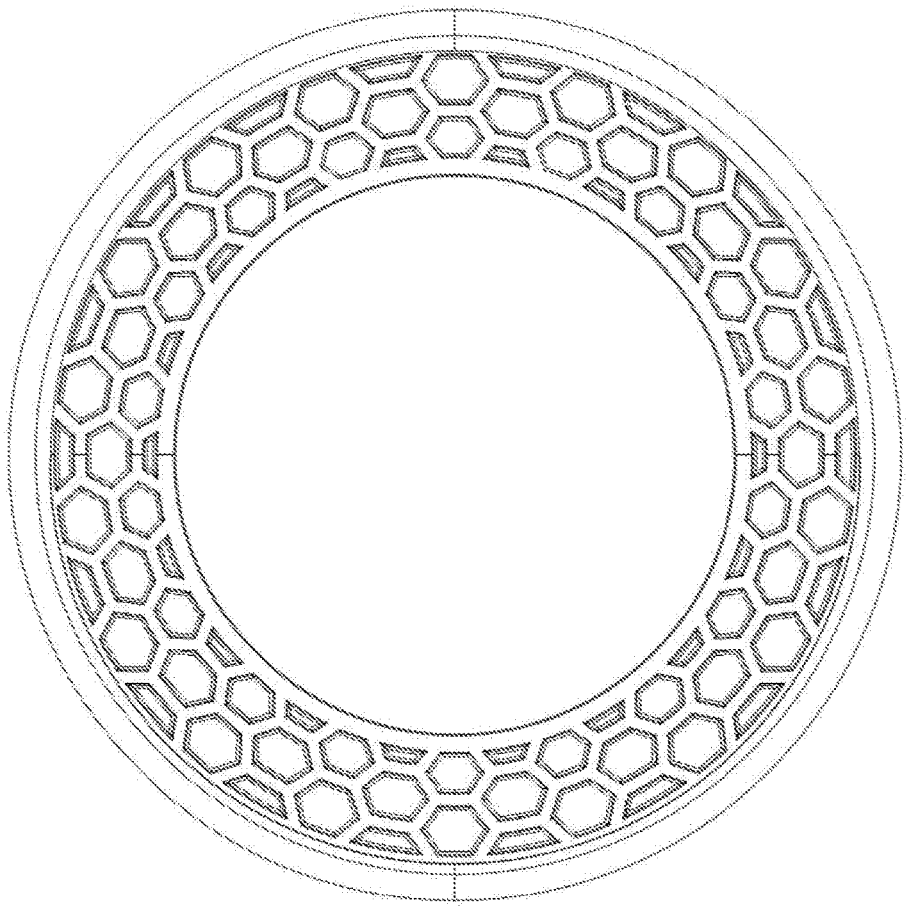
FIG. 35 is side elevation of an eleventh embodiment of a tire with greater width.
Figure 36:
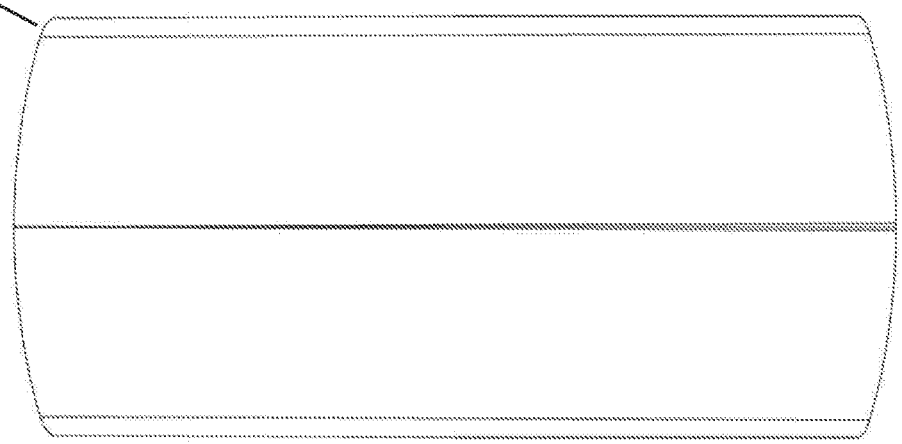
FIG. 36 is a top plan view of the tire of FIG. 35 showing the crown tire surface.
Figure 37:
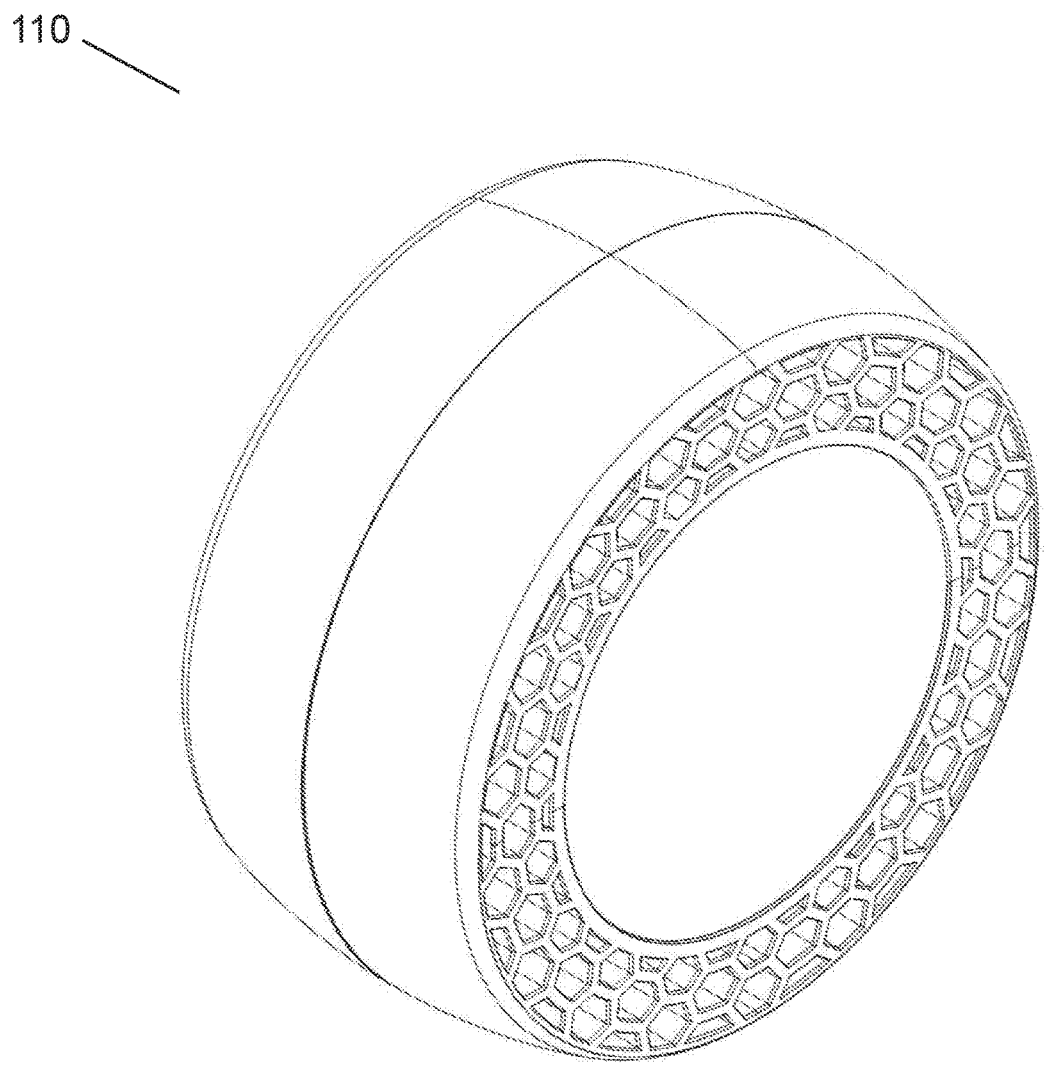
FIG. 37 is a top perspective of the tire of FIG. 35.

FIG. 35-37 illustrates an eleventh embodiment of a tire 110 with greater width.

Figure 38:
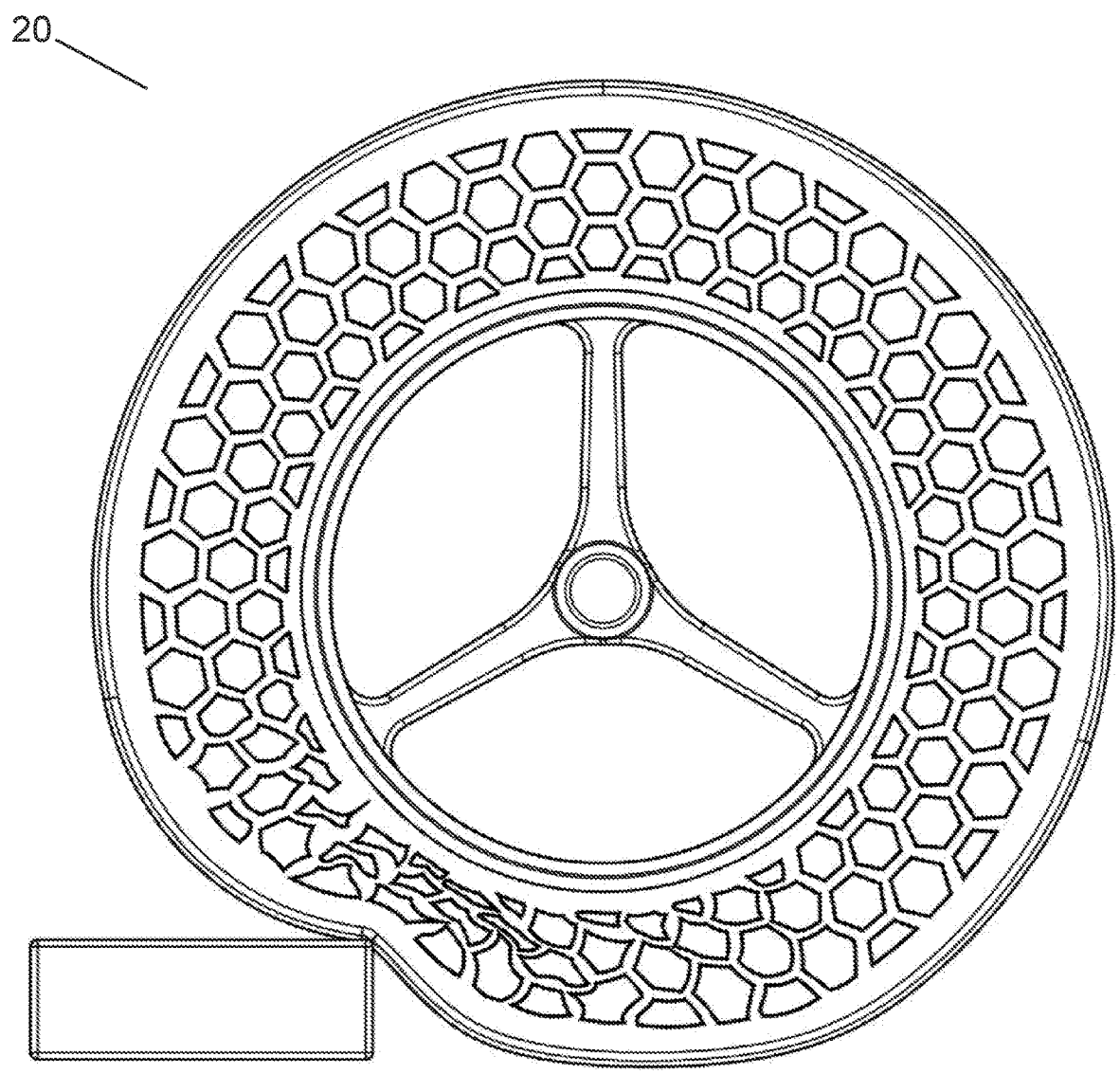
FIG. 38 illustrates a tire under compression as the tire traverses an obstacle.

FIG. 38 illustrates a tire under compression as the tire traverses an obstacle.

Figure 39:
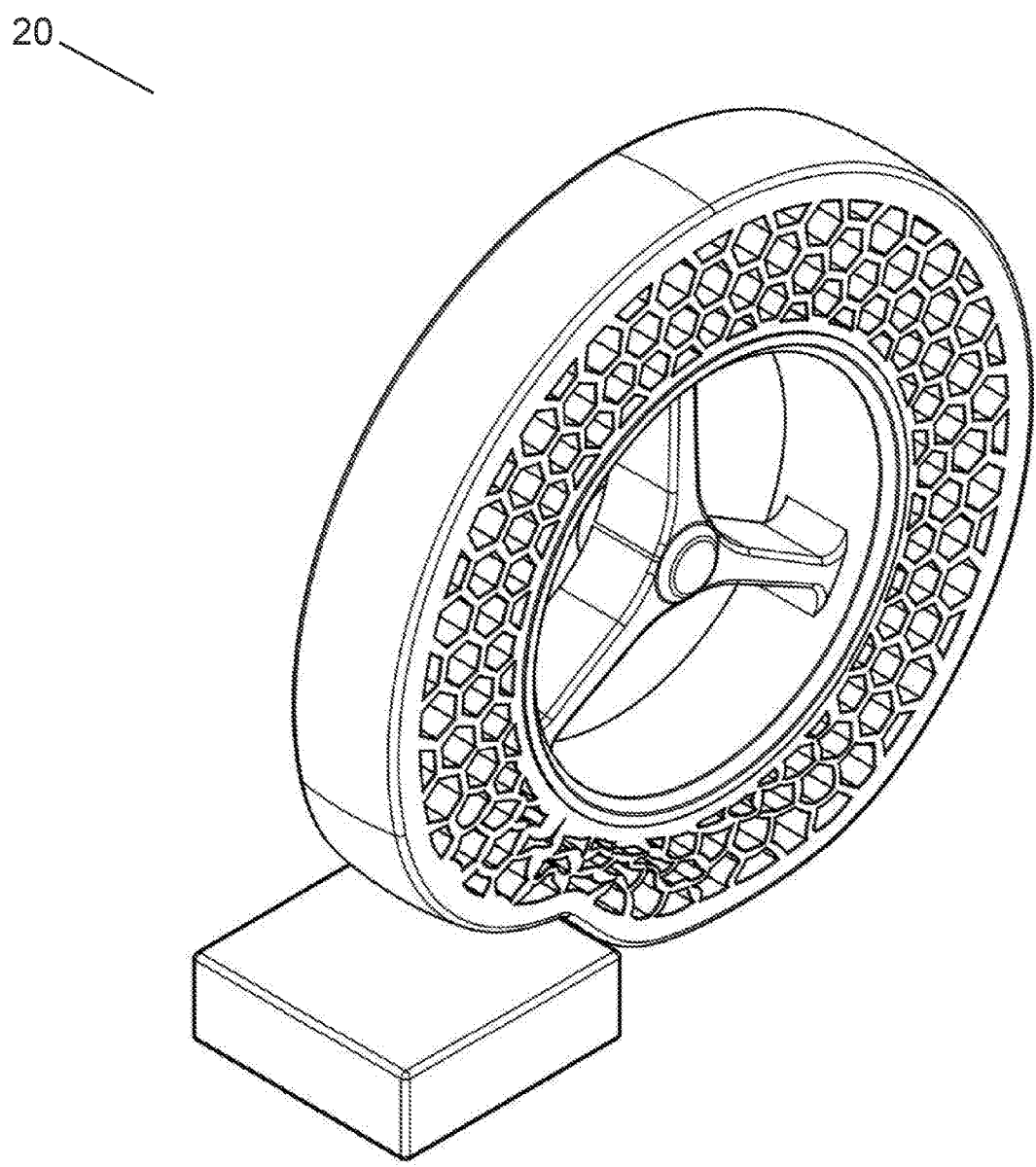
FIG. 39 illustrates a tire under compression as the tire traverses an obstacle.

FIG. 39 illustrates a tire under compression as the tire traverses an obstacle.

The improved mobility assistant apparatus uses uniquely designed wheels to absorb obstacles, creating a smoother and uninterrupted walking experience. The wheels have a honeycomb structure, created from medium-density rubber, which allows them to seamlessly conform and pass over obstacles in the ground without hesitation. The flexible wheels contact the ground over a larger area than traditional wheels increasing stability for the user.

The next issue we identified in testing existing walkers were the wheels. Existing walkers can be tripped up by small obstacles like rugs, cords, cracks in the ground or doorsills. To solve this, we took inspiration from military airless tires which use flexible structures inside the wheels to absorb and pass over obstacles. We adapted this technology to be used with flexible rubber wheels that are the same size as traditional walker wheels, but can overcome a wide range of obstacles without hesitation. These wheels are vital to offering a smooth walking experience while using the improved mobility assistant apparatus. No other walker on the market has wheels that offer the same benefits as the wheels we created for the improved mobility assistant apparatus.

Mobility apparatuses use the low impact hexagonal non-pneumatic-tires.

The tire's inner core preferably consists of a hexagonal membrane that extends parallel to the axel of the tire and extends out of each side of the wheel such that it is visible.

The tire's inner core preferably flexes perpendicularly to the axle of the wheel which is better for absorbing impact.

The tire may be bonded to the rim using an adhesive.

The tire may use the natural elastomeric tension in the wheel to attach to the rim.

The entire tire may be made of a single material.

The entire tire may be made using co-molding or over-molding to take advantage of properties of various polymers.

The tire relies on compression between the footprint of the tire and the hub to absorb shock from small obstacles (such as cracks in the ground, door sills, cords, rugs, etc).

In one case, it is created for light duty consumer applications.

The tire may be used as part of a narrow wheel designed for direct replacement on light-duty equipment like a walker, suitcases, strollers, yard equipment, shopping carts, etc.

The tire may be used as part of a wheel designed for custom applications on light-duty equipment.

Increasing or varying wall-thickness in web of non-pneumatic tire, allows for variable compression rate in tire.

The tire may have an arced crown on wheel for low rolling resistance under low force, increases compression in center of wheel (important for narrow applications), curved edges reduce wear on the tire, curved edges make turning easier.

The wheel may have a molded in tread pattern.

The tire may have increased compression in the center of the wheel draft on mold, creates a thicker inner cross-section of the tire, leading to increased compression ratio in center of wheel, arced crown on wheel focuses forces on center of the tire.

Thicker outer 'wear' layer molded into tire. In embodiment, this is co-molded for increased wear resistance and decreased rolling resistance.

Created to be cost effective for mass production: may be created in single shot mold; created from standard polymers or rubber; narrow tires allow for a shallow mold; tire designed to function with standard draft needed for injection molding; wheel diameter allows entire tire to be made in standard injection molding equipment.

The inner web of the tire consists of polygonal reliefs offset from each other over multiple layers in a radially symmetric pattern to create a web, which naturally compresses to absorb shock from obstacles.

A preferred embodiment is a light duty non-pneumatic-tire ("NPT").

The inner web of the NPT preferably consists of generally polygonal reliefs offset from each other over layers in a radially symmetric pattern to create a web which naturally compresses to absorb shock from obstacles.

The NPT preferably relies on compression between the footprint of the tire and the hub to absorb shock from small obstacles (such as cracks in the ground, door sills, cords, rugs, etc).

In some embodiments, increasing or varying wall-thickness in web of the NPT allows for variable compression rate in tire.

In some embodiments, an arced crown on the wheel allows for low rolling resistance under low force, increases compression in center of wheel (important for narrow applications), curved edges reduce wear on the tire, curved edges make turning easier, and it may have a molded in tread.

Increased compression in a center of a wheel is achieved by a draft on a mold, which creates a thicker inner cross-section of the tire, leading to increased compression ratio in center of wheel. The arced crown on wheel focuses forces on center of the tire.

In one embodiment, a thicker outer 'wear' layer is molded into the tire. In one embodiment, this could be co-molded for increased wear resistance and decreased rolling resistance.

The NPT mounting to a rim. The NPT is stretched to fit onto a rim or hub, using the wheels natural elastomeric tension to hold it in place on the rim or hub. The NPT is adhered onto the rim or hub. The rim or hub may have a lip to keep the tire on the rim or hub.

The following dimensions relate to the tire depicted in FIGS. 1-4. Tire Width: preferable 1.10 inch; range 0.75 inch to 2.00 inches. Tire OD: preferable 5.75 inch; range 3.75 inch to 8.75 inch. Tire ID: preferable 3.62 inch; range 1.62 inch to 6.62 inch. Web OD: preferable 5.20 inch; range 3.20 inch to 8.20 inch. Web ID: preferable 4.53 inch; range 2.53 inch to 7.53 inch. Reliefs per web outer circumference per layer: preferable 2.20; range 1.50 to 3.00. Web Wall Thickness at OD (Outside Plane): preferable 0.10 inch; range 0.07 inch to 1.25 inch. Web Wall Thickness at ID (Outside Plane): preferable 0.10 inch; range 0.07 inch to 1.25 inch. Web Wall Thickness at OD (Center Plane): preferable 0.13 inch; range 0.10 inch to 1.75 inch. Web Wall Thickness at ID (Center Plane): preferable 0.13 inch; range 0.10 inch to 1.75 inch. Web Wall Thickness Draft: 2°; range 0° to 5°. Outer Hexagonal Relief Width: preferable 0.42 inch; range 0.32 inch to 0.52 inch. Outer Hexagonal Relief Height: preferable 0.30 inch; range 0.20 inch to 0.40 inch. Inner Hexagonal Relief Width: preferable 0.36 inch; range 0.26 inch to 0.46 inch. Inner Hexagonal Relief Height: preferable 0.25 inch; range 0.15 inch to 0.35 inch. Arced Crown on Tread Radius: preferable 0.81 inch; range 0.00 inch to 2.00 inch. Tread Edge Radius: preferable 0.125 inch; range 0.00 inch to 0.50 inch.

The following dimensions relate to the tire depicted in FIGS. 8-10. Tire Width: preferable 1.17 inches; range 1.00 inch to 2.50 inches. Tire OD: preferable 7.00 inch; range 5.00 inches to 10.00 inches. Tire ID: preferable 4.19 inch; range 2.20 inches to 7.19 inch. Web OD: preferable 6.43 inches; range 4.43 inches to 9.43 inches. Web ID: preferable 4.42 inches; range 2.42 inches to 7.42 inches. Reliefs per web outer circumference per layer: preferable 2.18; range 1.50 to 3.00. Web Wall Thickness at OD (Outside Plane): preferable 0.12 inch; range 0.10 inch to 0.18 inch. Web Wall Thickness at ID (Outside Plane): preferable 0.12 inch; range 0.10 inch to 0.18 inch. Web Wall Thickness at OD (Center Plane): preferable 0.12 inch; range 0.10 inch to 0.18 inch. Web Wall Thickness at ID (Center Plane): preferable 0.12 inch; range 0.10 inch to 0.18 inch. Web Wall Thickness Draft: 0°; range 0° to 5°. Outer Hexagonal Relief Width: preferable 0.42 inch; range 0.32 inch to 0.52 inch. Outer Hexagonal Relief Height: preferable 0.37 inch; range 0.67 inch to 0.47 inch. Inner Hexagonal Relief Width: preferable 0.31 inch; range 0.21 inch to 0.41 inch. Inner Hexagonal Relief Height: preferable 0.33 inch; range 0.23 inch to 0.43 inch. Arced Crown on Tread Radius: preferable 1.72 inch; range 0.50 inch to 2.50 inches. Tread Edge Radius: preferable 0.10 inch; range 0.00 inch to 0.50 inch.

The following dimensions relate to the tire depicted in FIGS. 11-13. Tire Width: preferable 1 inch; range 0.50 inch to 1.50 inches. Tire OD: preferable 4.12 inches; range 1.00 inch to 4.62 inches. Tire ID: preferable 1.44 inch; range 0.44 inch to 1.94 inches. Web OD: preferable 3.62 inches; range 1.62 inches to 4.12 inches. Web ID: preferable 1.77 inches; range 0.77 inch to 2.27 inches. Reliefs per web outer circumference per layer: preferable 2.11; range 1.00 to 2.50. Web Wall Thickness at OD (Outside Plane): preferable 0.10 inch; range 0.05 inch to 1.50 inches. Web Wall Thickness at ID (Outside Plane): preferable 0.12 inch; range 0.05 inch to 1.50 inches. Web Wall Thickness at OD (Center Plane): preferable 0.10 inch; range 0.05 inch to 1.50 inches. Web Wall Thickness at ID (Center Plane): preferable 0.12 inch; range 0.05 inch to 1.50 inches. Web Wall Thickness Draft: 0°; range 0° to 5°. Outer Hexagonal Relief Width: preferable 0.44 inch; range 0.34 inch to 0.54 inch. Outer Hexagonal Relief Height: preferable 0.33 inch; range 0.23 inch to 0.43 inch. Inner Hexagonal Relief Width: preferable 0.19 inch; range 0.09 inch to 0.29 inch. Inner Hexagonal Relief Height: preferable 0.24 inch; range 0.14 inch to 0.34 inch. Arced Crown on Tread Radius: preferable 1.37 inches; range 0.00 inch to 2.50 inches. Tread Edge Radius: preferable 0.10 inch; range 0.00 inch to 0.25 inch.

The following dimensions relate to the tire depicted in FIGS. 14-16. Tire Width: preferable 1.00 inch; range 0.50 inch to 1.50 inches. Tire OD: preferable 4.12 inches; range 1.12 inches to 4.62 inches. Tire ID: preferable 1.44 inches; range 0.44 inch to 1.94 inches. Web OD: preferable 3.62 inches; range 1.62 inches to 4.12 inches. Web ID: preferable 1.77 inches; range 0.77 inch to 2.27 inches. Reliefs per web outer circumference per layer: preferable 2.11; range 0.80 to 2.80. Web Wall Thickness at OD (Outside Plane): preferable 0.10 inch; range 0.05 inch to 1.50 inches. Web Wall Thickness at ID (Outside Plane): preferable 0.10 inch; range 0.05 inch to 1.50 inches. Web Wall Thickness at OD (Center Plane): preferable 0.10 inch; range 0.05 inch to 1.50 inches. Web Wall Thickness at ID (Center Plane): preferable 0.10 inch; range 0.05 inch to 1.50 inches. Web Wall Thickness Draft: 0°; range 0° to 5°. Outer Hexagonal Relief Width: preferable 0.44 inch; range 0.34 inch to 0.54 inch. Outer Hexagonal Relief Height: preferable 0.33 inch; range 0.23 inch to 0.43 inch. Inner Pentagonal Relief Width: preferable 0.23 inch; range 0.12 inch to 0.32 inch. Inner Pentagonal Relief Height: preferable 0.27 inch; range 0.17 inch to 0.37 inch. Arced Crown on Tread Radius: preferable 1.37 inches; range 0.00 inch to 2.50 inches. Tread Edge Radius: preferable 0.10 inch; range 0.00 inch to 0.25 inch.

The following dimensions relate to the tire depicted in FIGS. 17-19. Tire Width: preferable 1.67 inches; range 1.00 inch to 2.50 inches. Tire OD: preferable 6.83 inches; range 5.00 inches to 10.00 inches. Tire ID: preferable 4.19 inches; range 2.19 inches to 7.19 inches. Web OD: preferable 6.43 inches; range 4.43 inches to 9.43 inches. Web ID: preferable 4.42 inches; range 2.42 inches to 7.42 inches. Reliefs per web outer circumference per layer: preferable 2.18; range 1.00 to 4.00. Web Wall Thickness at OD (Outside Plane): preferable 0.11 inch; range 0.10 inch to 0.18 inch. Web Wall Thickness at ID (Outside Plane): preferable 0.11 inch; range 0.10 inch to 0.18 inch. Web Wall Thickness at OD (Center Plane): preferable 0.11 inch; range 0.10 inch to 0.18 inch. Web Wall Thickness at ID (Center Plane): preferable 0.11 inch; range 0.10 inch to 0.18 inch. Web Wall Thickness Draft: 0°; range 0° to 5°. Outer Hexagonal Relief Width: preferable 0.42 inch; range 0.34 inch to 0.54 inch. Outer Hexagonal Relief Height: preferable 0.37 inch; range 0.27 inch to 0.47 inch. Inner Hexagonal Relief Width: preferable 0.31 inch; range 0.21 inch to 0.41 inch. Inner Hexagonal Relief Height: preferable 0.33 inch; range 0.23 inch 0.43 inch. Arced Crown on Tread Radius: 0.00 inch; range 0.00 inch to 1.00 inch. Tread Edge Radius: preferable 0.05 inch; range 0.00 inch to 0.25 inch.

The following dimensions relate to the tire depicted in FIGS. 20-22. Tire Width: preferable 1.75 inch; range 1.00 inch to 5.00 inches. Tire OD: preferable 7.40 inches; range 6.40 inches to 11.40 inches. Tire ID: preferable 5.00 inches; range 4.00 inches to 9.00 inches. Web OD: preferable 6.79 inches; range 5.80 inches to 10.79 inches. Web ID: preferable 5.24 inches; range 4.24 inches to 9.24 inches. Reliefs per web outer circumference per layer: preferable 1.12; range 0.25 to 2.15. Web Wall Thickness at OD (Outside Plane): preferable 0.15 inch; range 0.05 inch to 0.45 inch. Web Wall Thickness at ID (Outside Plane): preferable 0.15 inch; range 0.05 inch to 0.45 inch. Web Wall Thickness at OD (Center Plane): preferable 0.15 inch; range 0.05 inch to 0.45 inch. Web Wall Thickness at ID (Center Plane): preferable 0.15 inch; range 0.05 inch to 0.45 inch. Web Wall Thickness Draft: 0°; range 0° to 5°. Outer Hexagonal Relief Width: preferable 0.90 inch; range 0.75 inch to 1.50 inches. Outer Hexagonal Relief Height: preferable 0.78 inch; range 0.58 inch to 1.38 inches. Inner Hexagonal Relief Width: preferable 0.40 inch; range 0.20 inch to 1.00 inch. Inner Hexagonal Relief Height: preferable 0.35 inch; range 0.15 inch to 0.95 inch. Arced Crown on Tread Radius: preferable 2.05 inches; range 0.00 inch to 3.00 inches. Tread Edge Radius: preferable 0.05 inch; range 0.00 inch to 0.50 inch.

The following dimensions relate to the tire depicted in FIGS. 23-25. Tire Width (Tw): preferable 1.25 inches; range 1.00 inch to 2.50 inches. Tire OD ($T_{OD}$): preferable 7.30 inches; range 4.30 inches to 10.30 inches. Tire ID ($T_{ID}$): preferable 4.50 inches; range 1.50 inches to 7.50 inches. Web OD ($W_{OD}$): preferable 6.87 inches; range 3.87 inches to 9.87 inches. Web ID ($W_{ID}$): preferable 4.67 inches; range 1.67 inches to 7.67 inches. Reliefs per web outer circumference per layer: preferable 2.97; range 2.55 to 4.55. Web Wall Thickness at OD (Outside Plane): preferable 0.10 inch; range 0.05 inch to 0.21 inch. Web Wall Thickness at ID (Outside Plane ($P_O$)): preferable 0.10 inch; range 0.05 inch to 0.21 inch. Web Wall Thickness at OD (Center Plane ($P_C$): preferable 0.10 inch; range 0.05 inch to 0.21 inch. Web Wall Thickness ($W_T$) at ID (Center Plane): preferable 0.10 inch; range 0.05 inch to 0.21 inch. Web Wall Thickness Draft (D): 0°; range 0° to 5°. Outer Hexagonal Relief Width ($H_{OW}$): preferable 0.36 inch; range 0.16 inch to 0.56 inch. Outer Hexagonal Relief Height ($H_{OH}$): preferable 0.30 inch; range 0.10 inch to 0.50 inch. Inner Hexagonal Relief Width ($H_{IW}$): preferable 0.27 inch; range 0.07 inch to 0.47 inch. Inner Hexagonal Relief Height AO: preferable 0.30 inch; range 0.10 inch to 0.50 inch. Arced Crown on Tread Radius ($AC_R$): preferable 1.39 inches; range 0.00 inch to 3.00 inches. Tread Edge Radius ($E_R$): preferable 0.05 inch; range 0.00 inch to 0.25 inch.

The following dimensions relate to the tire depicted in FIGS. 26-28. Tire Width: preferable 1.375 inches; range 1.00 inch to 2.75 inches. Tire OD: preferable 6.80 inches; range 4.80 inches to 8.80 inches. Tire ID: preferable 4.05 inch; range 2.05 inch to 6.05 inches. Web OD: preferable 6.30 inches; range 4.30 inches to 8.30 inches. Web ID: preferable 4.30 inches; range 2.30 inches to 6.30 inches. Reliefs per web outer circumference per layer: preferable 2.83; range 2.53 to 3.58. Web Wall Thickness at OD (Outside Plane): preferable 0.10 inch; range 0.05 inch to 1.65 inches. Web Wall Thickness at ID (Outside Plane): preferable 0.08 inch; range 0.05 inch to 1.65 inches. Web Wall Thickness at OD (Center Plane): preferable 0.10 inch; range 0.05 inch to 1.65 inch. Web Wall Thickness at ID (Center Plane): preferable 0.08 inch; range 0.05 inch to 1.65 inches. Web Wall Thickness Draft: 0°; range 0° to 5°. Outer Hexagonal Relief Width: preferable 0.51 inch; range 0.41 inch to 0.61 inch. Outer Hexagonal Relief Height: preferable 0.37 inch; range 0.27 inch to 0.47 inch. Inner Hexagonal Relief Width: preferable 0.37 inch; range 0.27 inch to 0.46 inch. Inner Hexagonal Relief Height: preferable 0.22 inch; range 0.12 inch to 0.32 inch. Arced Crown on Tread Radius: preferable 0.00 inch; range 0.00 inch to 2.80 inches. Tread Edge Radius: preferable 0.125 inch; range 0.00 inch to 0.25 inch.

The following dimensions relate to the tire depicted in FIGS. 29-31. Tire Width: preferable 1.10 inches; range 0.75 inch to 2.00 inches. Tire OD: preferable 5.75 inches; range 3.75 inches to 8.75 inches. Tire ID: preferable 3.62 inches; range 1.62 inches to 6.62 inches. Web OD: preferable 5.20 inches; range 3.20 inches to 8.20 inches. Web ID: preferable 4.53 inches; range 2.53 inches to 7.53 inches. Reliefs per web outer circumference per layer: preferable 2.20; range 1.50 to 3.00. Web Wall Thickness at OD (Outside Plane): preferable 0.10 inch; range 0.07 inch to 1.25 inches. Web Wall Thickness at ID (Outside Plane): preferable 0.10 inch; range 0.07 inch to 1.25 inches. Web Wall Thickness at OD (Center Plane): preferable 0.13 inch; range 0.10 inch to 1.75 inches. Web Wall Thickness at ID (Center Plane): preferable 0.13 inch; range 0.10 inch to 1.75 inches. Web Wall Thickness Draft: 2°; range 0° to 5°. Outer Hexagonal Relief Width: preferable 0.42 inch; range 0.32 inch to 0.52 inch. Outer Hexagonal Relief Height: preferable 0.30 inch; range 0.20 inch to 0.40 inch. Inner Hexagonal Relief Width: preferable 0.36 inch; range 0.26 inch to 0.46 inch. Inner Hexagonal Relief Height: preferable 0.25 inch; range 0.15 inch to 0.35 inch. Arced Crown on Tread Radius: preferable 0.81 inch; range 0.00 inch to 2.00 inches. Tread Edge Radius: preferable 0.125 inch; range 0.00 inch to 0.50 inch.

The following dimensions relate to the tire depicted in FIG. 32-34. Tire Width: preferable 1.25 inches; range 0.75 inch to 2.25 inches. Tire OD: preferable 7.30 inches; range 4.30 inches to 9.30 inches. Tire ID: preferable 4.50 inches; range 1.50 inches to 6.50 inches. Web OD: preferable 6.87 inches; range 3.87 inches to 8.87 inches. Web ID: preferable 4.67 inches; range 2.67 inches to 7.67 inches. Reliefs per web outer circumference per layer: preferable 1.30; range 0.50 to 2.00. Web Wall Thickness at OD (Outside Plane): preferable 0.10 inch; range 0.05 inch to 0.18 inch. Web Wall Thickness at ID (Outside Plane): preferable 0.10 inch; range 0.05 inch to 0.18 inch. Web Wall Thickness at OD (Center Plane): preferable 0.10 inch; range 0.05 inch to 0.18 inch. Web Wall Thickness at ID (Center Plane): preferable 0.10 inch; range 0.05 inch to 0.18 inch. Web Wall Thickness Draft: 0°; range 0° to 5°. Outer Hexagonal Relief Width: preferable 0.73 inch; range 0.53 inch to 0.93 inch. Outer Hexagonal Relief Height: preferable 0.30 inch; range 0.18 inch to 0.43 inch. Inner Hexagonal Relief Width: preferable 0.55 inch; range 0.35 inch to 0.75 inch. Inner Hexagonal Relief Height: preferable 0.30 inch; range 0.18 inch to 0.42 inch. Arced Crown on Tread Radius: preferable 1.39 inches; range 0.00 inch to 2.50 inches. Tread Edge Radius: preferable 0.05 inch; range 0.00 inch to 0.25 inch.

The following dimensions relate to the tire depicted in FIG. 35-37. Tire Width: preferable 2.73 inches; range 2.50 inches to 10.50 inches. Tire OD: preferable 5.75 inches; range 3.75 inches to 8.75 inches. Tire ID: preferable 3.62 inches; range 1.62 inch to 6.62 inches. Web OD: preferable 5.20 inches; range 3.20 inches to 8.20 inches. Web ID: preferable 4.53 inches; range 2.53 inches to 7.53 inches. Reliefs per web outer circumference per layer: preferable 2.20; range 1.5 to 3.00. Web Wall Thickness at OD (Outside Plane): preferable 0.10 inch; range 0.07 inch to 1.25 inches. Web Wall Thickness at ID (Outside Plane): preferable 0.10 inch; range 0.07 inch to 1.25 inches. Web Wall Thickness at OD (Center Plane): preferable 0.13 inch; range 0.10 inch to 1.75 inches. Web Wall Thickness at ID (Center Plane):

preferable 0.13 inch; range 0.10 inch to 1.75 inches. Web Wall Thickness Draft: 1°; range 0° to 5°. Outer Hexagonal Relief Width: preferable 0.42 inch; range 0.32 inch to 0.52 inch. Outer Hexagonal Relief Height: preferable 0.30 inch; range 0.20 inch to 0.40 inch. Inner Hexagonal Relief Width: preferable 0.36 inch; range 0.26 inch to 0.46 inch. Inner Hexagonal Relief Height: preferable 0.25 inch; range 0.15 inch to 0.35 inch. Arced Crown on Tread Radius: preferable 5.54 inches; range 0.625 inch to 2.00 inches. Tread Edge Radius: preferable 0.125 inch; range 0.00 inch to 0.50 inch. From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention the following:

1. A light-weight walker comprising:
   a wheel comprising:
      a hub and a low impact tire, wherein the low impact tire comprises an inner web comprising polygonal reliefs offset from each other over multiple layers in a radially symmetric pattern to create a web which naturally compresses to absorb shock from obstacles, wherein the low impact tire has an outer diameter (OD) ranging from 3.75 inches to 8.75 inches, an inner diameter (ID) ranging from 2.53 inches to 7.53 inches, a web inner diameter ranging from 2.53 inches to 7.53 inches, a web outer diameter ranging from 3.20 inches to 8.20 inches, an outer hexagonal relief width ranging from 0.32 inch to 0.52 inch, an outer hexagonal relief height ranging from 0.20 inch to 0.40 inch, an inner hexagonal relief width ranging from 0.26 inch to 0.46 inch, and an inner hexagonal relief height ranging from 0.15 inch to 0.35 inch.

2. A light-weight walker according to claim 1 wherein the low impact tire is composed of a polyurethane material having a Shore A hardness is less than 90 and greater than 10.

3. A light-weight walker according to claim 1 wherein the low impact tire comprises an inner core comprising a hexagonal membrane that extends parallel to the axel of the tire and extends out of each side of the wheel such that it is visible.

4. A light-weight walker according to claim 1 wherein the low impact tire comprises an inner core that flexes perpendicularly to the axle of the wheel which is better for absorbing impact.

5. A light-weight walker according to claim 1 wherein the low impact tire is bonded to a rim using an adhesive.

6. A light-weight walker according to claim 1 wherein the low impact tire uses a natural elastomeric tension in the wheel to attach to the rim.

7. A light-weight walker according to claim 1 wherein the ID is approximately 63% of the OD.

8. A light-weight walker according to claim 1 wherein the low impact tire is made using co-molding or over-molding to take advantage of properties of various polymers.

9. A light-weight walker according to claim 1 wherein the low impact tire relies on compression between a footprint of the tire and a hub to absorb shock from small obstacles.

10. A light-weight walker according to claim 1 wherein the low impact tire is for light duty consumer applications.

11. A light-weight walker according to claim 1 wherein the wheel is a narrow wheel designed for direct replacement on light-duty equipment selected from the group consisting of a walker, suitcases, strollers, yard equipment, and shopping carts.

12. A light-weight walker according to claim 1 wherein the wheel is designed for custom applications on light-duty equipment.

13. A light-weight walker according to claim 1 wherein the low impact tire has increasing or varying wall-thickness in web of non-pneumatic tire, which allows for variable compression rate in the tire.

14. A light-weight walker according to claim 1 wherein the low impact tire has an arced crown for low rolling resistance under low force, which increases compression in a center of the wheel.

15. A light-weight walker according to claim 1 wherein the low impact tire has increased compression in the center of the wheel draft on mold, which creates a thicker inner cross-section of the tire, leading to increased compression ratio in center of wheel, and an arced crown on the low impact tire which focuses forces on a center of the low impact tire.

16. A light-weight walker according to claim 1 wherein the low impact tire has a thicker outer wear layer molded into tire, co-molded for increased wear resistance and decreased rolling resistance.

17. A light-weight walker according to claim 16 wherein the ID is approximately 63% of the OD.

18. A light-weight walker according to claim 16 wherein the tire is designed to function with a standard draft for injection molding.

19. A light-weight walker comprising:
   a wheel comprising:
      a tire with an inner web comprising polygonal reliefs offset from each other over multiple layers in a radially symmetric pattern to create a web which naturally compresses to absorb shock from obstacles, wherein the tire has an outer diameter ranging from 3.75 inches to 8.75 inches, an inner diameter ranging from 2.53 inches to 7.53 inches, a web inner diameter ranging from 2.53 inches to 7.53 inches, a web outer diameter ranging from 3.20 inches to 8.20 inches, a web wall outer plane thickness ranging from 0.07 inch to 1.25 inches, a web wall center plane thickness ranging from 0.10 inch to 1.75 inches, a web wall thickness draft ranging from 0° to 5°, an outer hexagonal relief width ranging from 0.32 inch to 0.52 inch, an outer hexagonal relief height ranging from 0.20 inch to 0.40 inch, an inner hexagonal relief width ranging from 0.26 inch to 0.46 inch, an inner hexagonal relief height ranging from 0.15 inch to 0.35 inch, an arced crown on tread radius ranging from 0.00 inch to 2.00 inch and a tread edge radius ranging from 0.00 inch to 0.50 inch.

20. A light-weight walker comprising:
   a wheel comprising:
      a tire created in single shot mold from standard polymers or rubber, the tire comprising an inner web comprising polygonal reliefs offset from each other over multiple layers in a radially symmetric pattern to create a web which naturally compresses to absorb shock from obstacles, wherein the tire has an outer diameter (OD) ranging from 3.75 inches to 8.75 inches, an inner diameter (ID) ranging from 2.53 inches to 7.53 inches, a web inner diameter ranging from 2.53 inches to 7.53 inches, a web outer diameter ranging from 3.20 inches to 8.20 inches, a web wall outer plane thickness ranging from 0.07 inch to 1.25 inches, a web wall center plane thickness ranging from 0.10 inch to 1.75 inches, a web wall thickness draft ranging from 0° to 5°, an outer hexagonal relief width ranging from 0.32 inch to 0.52 inch, an outer hexagonal relief height ranging from 0.20 inch to 0.40 inch, an inner hexagonal relief width ranging from 0.26 inch to 0.46 inch, an inner hexagonal relief height ranging from 0.15 inch to 0.35 inch, an arced crown on tread radius of approximately 0.81 inch, and a tread edge radius of approximately 0.125 inch.

\* \* \* \* \*